United States Patent
Bonutti et al.

(10) Patent No.: US 12,326,133 B2
(45) Date of Patent: Jun. 10, 2025

(54) SYSTEMS AND METHODS FOR ENERGY HARVEST

(71) Applicant: P Tech, LLC, Manalapan, FL (US)

(72) Inventors: Peter M. Bonutti, Manalapan, FL (US); Justin E. Beyers, Effingham, IL (US); Tonya M. Bierman, Dieterich, IL (US)

(73) Assignee: P Tech, LLC, Manalapan, FL (US)

( * ) Notice: Subject to any disclaimer, the term of this patent is extended or adjusted under 35 U.S.C. 154(b) by 0 days.

(21) Appl. No.: 18/338,077

(22) Filed: Jun. 20, 2023

(65) Prior Publication Data

US 2024/0125295 A1    Apr. 18, 2024

Related U.S. Application Data

(63) Continuation of application No. 16/004,115, filed on Jun. 8, 2018, now Pat. No. 11,719,219.

(60) Provisional application No. 62/516,787, filed on Jun. 8, 2017.

(51) Int. Cl.
| | |
|---|---|
| F03B 13/26 | (2006.01) |
| F03B 11/00 | (2006.01) |
| F03B 13/14 | (2006.01) |
| F03B 13/18 | (2006.01) |
| F03B 13/20 | (2006.01) |
| F03B 17/06 | (2006.01) |
| F03D 1/06 | (2006.01) |
| H02N 2/18 | (2006.01) |

(52) U.S. Cl.
CPC ............ *F03B 13/264* (2013.01); *F03B 11/00* (2013.01); *F03B 13/145* (2013.01); *F03B 13/148* (2013.01); *F03B 13/1845* (2013.01); *F03B 13/185* (2013.01); *F03B 13/1855* (2013.01); *F03B 13/20* (2013.01); *F03B 17/06* (2013.01); *F03B 17/061* (2013.01); *F03D 1/06* (2013.01); *F03D 1/0675* (2013.01); *H02N 2/185* (2013.01); *F05B 2210/16* (2013.01); *F05B 2220/707* (2013.01); *F05B 2220/709* (2013.01); *F05B 2240/13* (2013.01); *F05B 2240/40* (2013.01); *F05B 2240/91* (2013.01); *F05B 2240/931* (2013.01); *F05B 2250/25* (2013.01); *F05B 2260/421* (2013.01)

(58) Field of Classification Search
CPC ..... F03B 11/00; F03B 17/06; F05B 2220/709
See application file for complete search history.

(56) References Cited

U.S. PATENT DOCUMENTS

| | | | |
|---|---|---|---|
| 6,644,027 B1 * | 11/2003 | Kelly | F03B 13/1845 |
| | | | 60/498 |
| 7,199,481 B2 | 4/2007 | Hirsch | |
| 7,323,790 B2 | 1/2008 | Taylor et al. | |
| 7,964,977 B2 | 6/2011 | Nair | |

(Continued)

OTHER PUBLICATIONS

Kim et al, "Wave Power Generation by Piezoelectric Sensor Attached to a Coastal Structure," Apr. 8, 2018. (Year: 2018).*

*Primary Examiner* — Tulsidas C Patel
*Assistant Examiner* — Thomas K Quigley
(74) *Attorney, Agent, or Firm* — Stinson LLP

(57) ABSTRACT

Systems and methods for use in capturing energy from natural resources. In one form, the systems and methods capture energy from natural resources, such as movement of fluid in a body of water, and convert it into electrical energy.

6 Claims, 41 Drawing Sheets

(56) References Cited

U.S. PATENT DOCUMENTS

| | | | |
|---|---|---|---|
| 7,999,444 B2* | 8/2011 | Sunaga | F03B 13/14 290/1 R |
| 8,067,849 B2 | 11/2011 | Stewart | |
| 8,334,606 B2* | 12/2012 | Oohara | F03D 9/11 290/44 |
| 8,350,394 B2 | 1/2013 | Cottone et al. | |
| 8,629,572 B1 | 1/2014 | Phillips | |
| 8,723,355 B2* | 5/2014 | Eder | F03B 13/16 290/43 |
| 9,435,316 B2 | 9/2016 | Chen et al. | |
| 10,047,717 B1 | 8/2018 | Phillips | |
| 2005/0174817 A1 | 8/2005 | Schmidt et al. | |
| 2008/0195255 A1 | 8/2008 | Lutze et al. | |
| 2009/0251258 A1 | 10/2009 | Rhinefrank et al. | |
| 2009/0278358 A1 | 11/2009 | Lemieux | |
| 2009/0295162 A1* | 12/2009 | Oohara | H02J 7/34 290/44 |
| 2010/0109329 A1 | 5/2010 | Brantingham | |
| 2010/0109482 A1* | 5/2010 | Sunaga | F03B 13/26 310/339 |
| 2010/0123313 A1 | 5/2010 | Hobdy | |
| 2011/0278848 A1 | 11/2011 | Gimsa | |
| 2012/0032444 A1 | 2/2012 | Burton | |
| 2012/0247096 A1 | 10/2012 | Gerber et al. | |
| 2012/0248865 A1* | 10/2012 | Eder | F03B 13/16 307/9.1 |
| 2013/0103217 A1* | 4/2013 | Tadano | G06Q 10/04 700/291 |
| 2013/0214532 A1* | 8/2013 | Hsu | F03D 5/00 290/43 |
| 2014/0217735 A1 | 8/2014 | Chen | |
| 2014/0217737 A1 | 8/2014 | Castillo | |
| 2015/0285212 A1* | 10/2015 | Wu | H10N 30/306 310/339 |
| 2016/0252071 A1 | 9/2016 | Phillips et al. | |
| 2017/0170751 A1* | 6/2017 | Chen | H02N 2/186 |
| 2017/0198401 A1 | 7/2017 | Phillips | |
| 2017/0234291 A1 | 8/2017 | Noia | |
| 2018/0045166 A1 | 2/2018 | Mundon et al. | |
| 2018/0195492 A1* | 7/2018 | Ruijssenaars | H10N 30/30 |
| 2018/0251713 A1 | 9/2018 | Angelescu et al. | |
| 2018/0355837 A1 | 12/2018 | Bonutti et al. | |
| 2019/0353139 A1 | 11/2019 | Sheldon-Coulson et al. | |
| 2020/0056578 A1 | 2/2020 | Sheldon-Coulson et al. | |

* cited by examiner

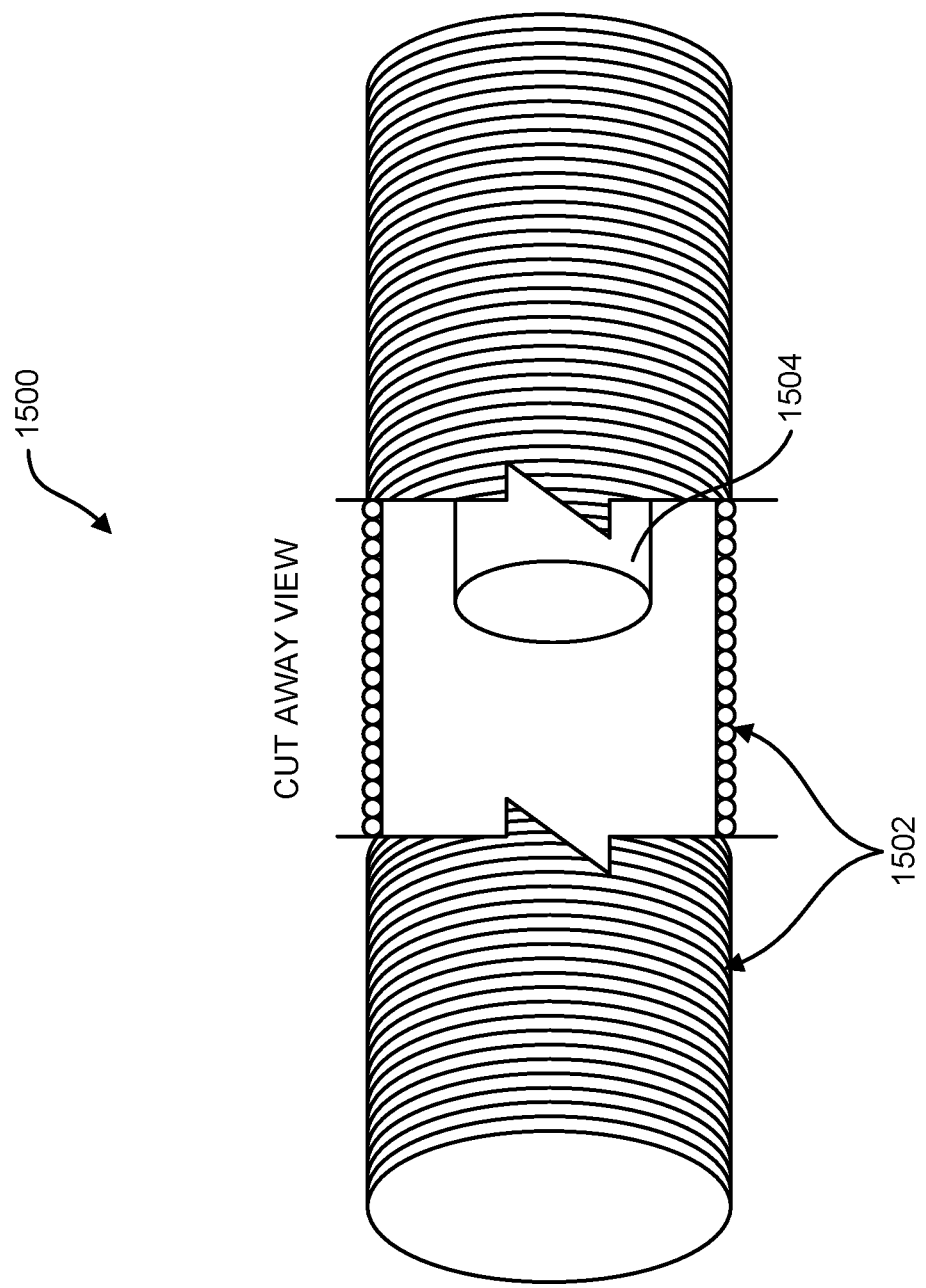

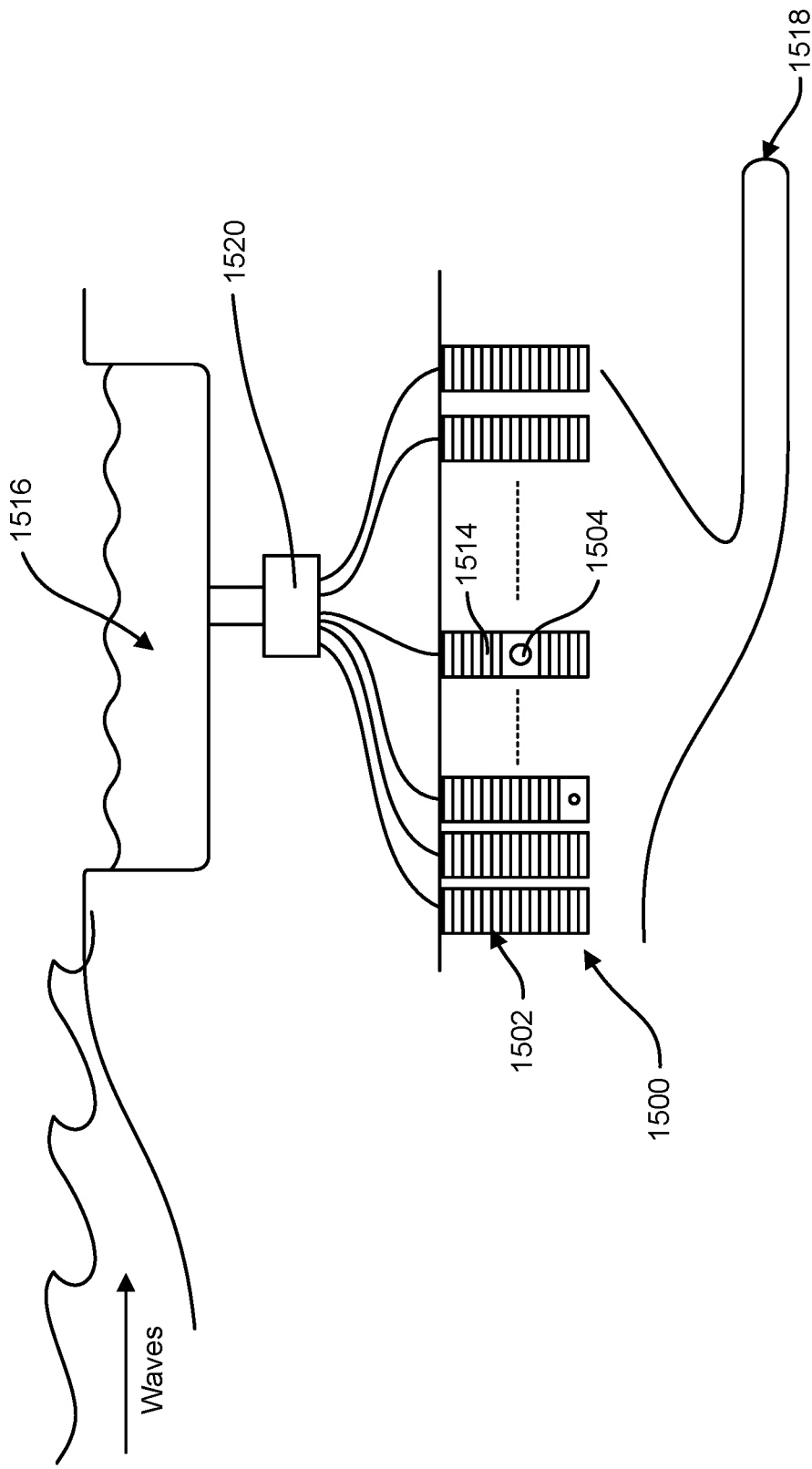

SYSTEMS AND METHODS FOR ENERGY HARVEST

CROSS-REFERENCE TO RELATED APPLICATIONS

This application is a continuation of U.S. patent application Ser. No. 16/004,115, filed Jun. 8, 2018, which claims priority to U.S. Provisional Patent Application No. 62/516,787, filed Jun. 8, 2017, the entire disclosures of which are hereby incorporated by reference.

FIELD

One field of the disclosure relates generally to energy creation, and more specifically, to methods and systems for energy creation utilizing natural resources. Other fields of the disclosure include biologics systems, drag modulation for wind or fluid flow patterns, magnetic fields for guidance and navigation, medical and non-medical devices, robotics, automotive technologies, fluid flow mechanics, cardiovascular fluid flow, altering electrical field flow, fiber optic communications, and encryption.

BACKGROUND

Conventional energy harvesting systems and methods are limited by inefficiencies and inconsistencies. For example, piezoelectric energy harvesting techniques have been incorporated into sidewalks, roads, and wearable clothing articles. These techniques have had limited success due to loss of energy through the conversion process and costly construction of the harvesting devices themselves. Moreover, these techniques are unreliable sources of energy and negatively affect the performance of the articles into which the piezoelectric elements are incorporated (e.g., difficult to keep walkers on a spongy sidewalk, etc.).

SUMMARY

In one aspect, a means of creating electrical power from natural resources (e.g., movement of fluid) is provided.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIGS. 16A-16I are views of alternative power generation units that may be used with the system shown in FIG. 1.

DETAILED DESCRIPTION

The systems and methods described herein enable the capture of energy from natural resources. The systems and methods described herein further enable aspects of biologics systems, drag modulation for wind or fluid flow patterns, magnetic fields for guidance and navigation, medical and non-medical devices, robotics, automotive technologies, fluid flow mechanics, cardiovascular fluid flow, altering electrical field flow, fiber optic communications, and encryption. The systems, methods, techniques, and/or concepts described herein may be combined with, utilized in or with, and/or utilize systems, methods, techniques, concepts, and the like described in U.S. patent application Ser. Nos. 10/287,379, 15/299,981, 10/421,965, 09/941,185, 10/102,413, 11/867,679, 62/552,091, and 62/552,096, each of which is referenced by incorporation in its entirety.

Figure 1:
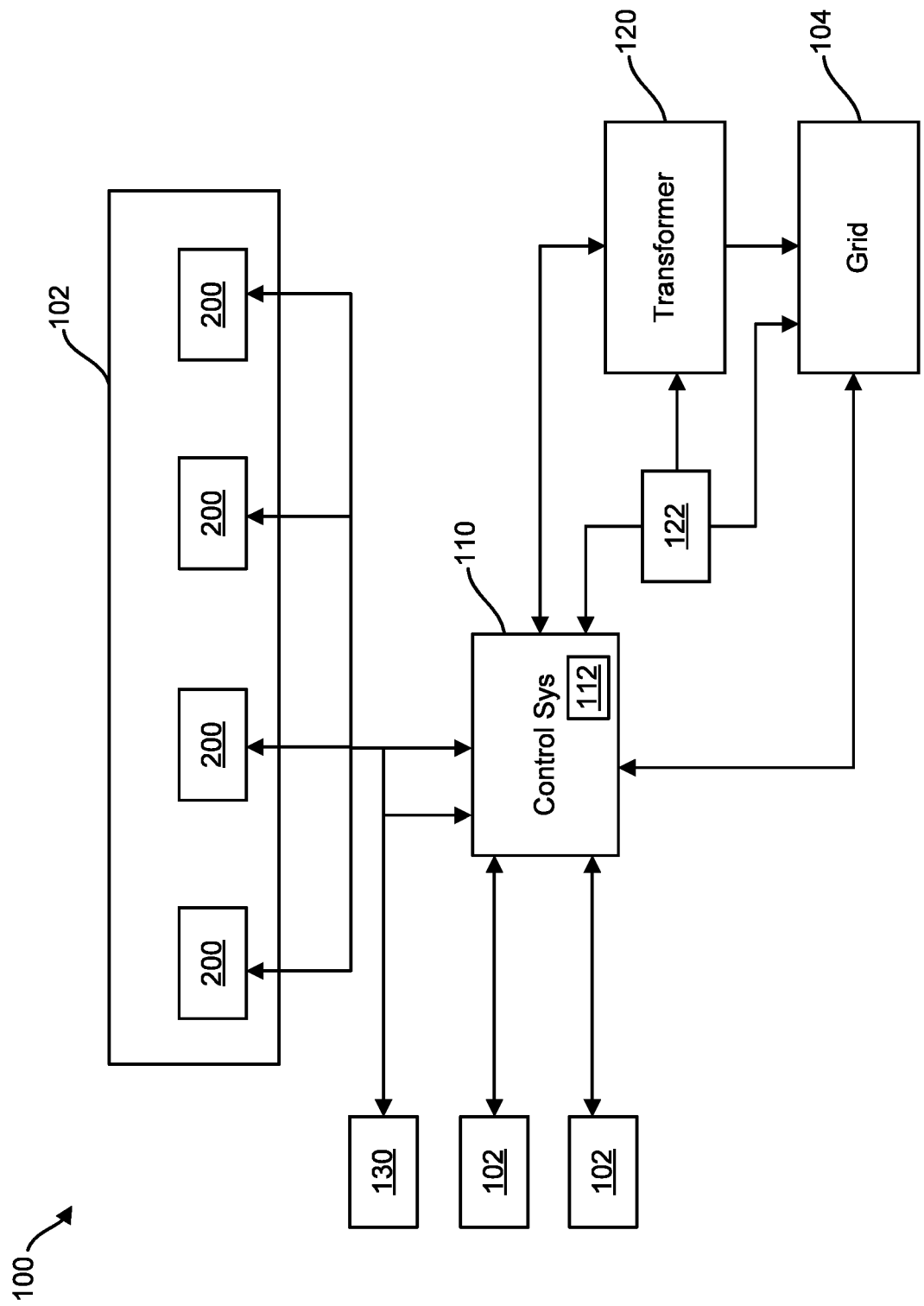
FIG. 1 is a block diagram illustrating an exemplary power generation system.

FIG. 1 is a block diagram illustrating an exemplary power generation system 100. The power generation system 100 includes a power generation farm 102 having a plurality of power generation units 200 operable to supply electrical power to a utility and/or power grid 104. Additionally, the utility 104 may receive power from other power generation units 200 and/or farms 102 to accommodate variability in power output of the farm 102 due to intermittent weather conditions. Other power generation units 200 include but are not limited to, wind, thermal, hydroelectric, and/or nuclear power stations, among others.

In an exemplary embodiment, the system 100 includes a control system 110 that includes a controller 112. The control system 110 is operable to monitor and control the collective power output of the farm 102. In some embodiments, the control system 110 includes power sensors, such as voltage and/or current sensors, which are configured to sense power output of the farm 102 and/or units 200. The power sensors may be coupled at any location in system 100 to monitor the output of units 200 including, but not limited to including, at or on units 200, in a farm 102, between farm 102 and control system 110, and at or in transformer 120. In some embodiments, control system 110 comprises a biological control system, an artificial intelligence control system, a navigation control system, a fluid flow control system, or the like.

The control system 110 is configured to communicate with units 200 via communication links, which may be implemented in hardware and software. In some embodiments, the communication links may be configured to remotely communicate data signals to and from the controller 112 in any known communication method including wirelessly (e.g., electromagnetic energy links, etc.) and wired. In additional or alternative embodiments, the communication links may be configured for encrypted communications. In operation, the data signals include a plurality of signals indicative of operating conditions of individual units 200 transmitted to the system 110 and various command signals communicated by system 110 to individual units 200 and/or farms 102. In some embodiments, control system 110 and/or units 200 are communicatively coupled to a remote computing device 130 that provides operating instructions. In such embodiments, remote computing device 130 includes, but is not limited to including, tablets, smartphones, laptops, wearables, and/or PCs. For example, remote computing device 130 may comprise a cloud computing system. In some embodiments, control system 110 and/or units 200 can be used to communicate with energy systems and encryption systems. Additionally or alternatively, control system 110 and/or units 200 can be configured to utilize one or more blockchains record data.

In the exemplary embodiment, control system 110 is also in communication with grid 104. In some embodiments, one or more storage units 122 are in communication between control system 110 and transformer 120 or grid 104. Storage units 122 are configured to act as a repository for energy that can be utilized by system 100 or transferred to transformer 120 and/or grid 104. In such embodiments, storage units 122 include, but are not limited to, capacitors, batteries, accumulator, and battery banks. The batteries include one or more materials and electrodes including, but not limited to lead-acid, nickel cadmium (NiCd), nickel metal hydride (NiMH), lithium ion (Li-ion), and lithium ion polymer (Li-ion polymer). In some embodiments, storage units 122 are used for novel battery systems, rechargeable systems, wireless systems, and the like. Transformer 120 is configured to provide power from the farm 102 to the grid 104 or a utility through in any required method including stepping-up voltage of the power produced by the farm. In some embodiments, control system 110, grid 104, storage units 122, and/or transformer 120 comprise a cloud computing system.

In some embodiments, control system 110 is operable to control various switching devices in the system 100, to control the power output of the farm 102 within specifications prescribed by transmission system requirements. For example, control system 110 is communicatively coupled to grid 104 such that power requirements for grid 104 are provided to system 100 and control system 110 is configured to receive such requirements and direct output of units 200 and/or direct power to one of storage units 122, transformer 120, and/or grid 104. For example, control system 110 is configured to provide power from the system anywhere from 0 to 100 percent of output of energy harvested. In additional or alternative embodiments, control system 110 is operable to control various switching devices in the system 100 to control the power output of the farm 102 based upon weather and/or environmental data. For example, control system 100 is communicatively coupled to the Internet (e.g., via a communication interface, as further described herein, application programming interface (API), etc.) such that weather and/or environmental data (e.g., temperature forecasts, cloud forecasts, historical weather patterns, tide data, oceanographic data, radar data, etc.) is provided to system 100 and control system 110 is configured to receive such data and direct output of units 200 and/or direct power to one of storage units 122, transformer 120, and/or grid 104.

Figure 2:
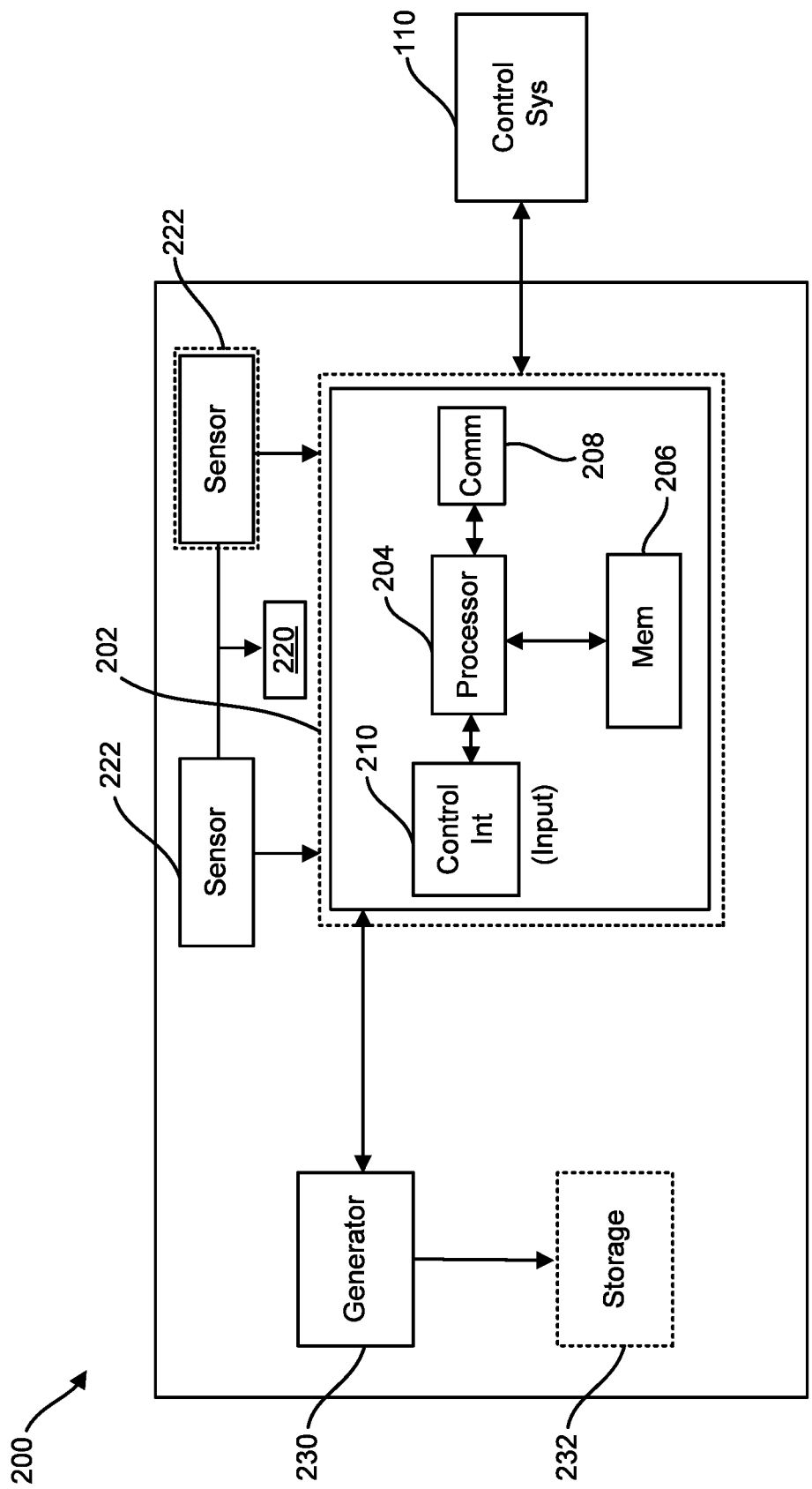
FIG. 2 is a block diagram illustrating an exemplary power generation unit for use with system shown in FIG. 1.

FIG. 2 is a block diagram illustrating an exemplary power generation unit 200 for use with system 100. In the exemplary embodiment, unit 200 includes a controller 202 for managing output of unit 200. Unit 200 also includes a generator or alternator 232 for creating electrical power from natural resources (e.g., movement of fluid) that is coupled to a storage unit 232 such as storage unit 122. Controller 202 includes a processor 204 for executing instructions and a memory device 206 configured to store data, such as computer-executable instructions and operating parameters. Controller 202 also includes a communication interface 208. Communication interface 208 is configured to be coupled in signal communication with one or more remote devices, such as another unit 200, another controller 202, control system 110, and/or a remote computing device 130. Controller 202 is configured to change resistance or movement patterns of unit 200 or even to shut off unit 200 if problems arise to enable auto diagnostics.

In some embodiments, unit 200 includes one or more sensor interfaces 220. Sensor interface 220 is configured to be communicatively coupled to one or more sensors 222 and may be configured to receive one or more signals from each sensor 222. Sensor interface 220 facilitates monitoring and/or unit 200. For example, controller 202 may monitor operating conditions (e.g., wave oscillations, wind speed, wind direction, salinity, flow, and/or power output) of unit 200 based on signals provided by sensors 222. In one embodiment, the controller 202 is configured to calculate a power output produced by the corresponding unit 200 based on one or more unit characteristics (e.g., unit dimensions), one or more operating parameters (e.g., wave oscillations), and/or an operational state (e.g., disabled or normal) of unit 200. In additional or alternative embodiments, sensor interface 220 is configured to be communicatively coupled (e.g., wired and/or wirelessly) one or more radar systems that use radio waves to monitor weather properties (e.g., precipitation, wind, etc.) to generate weather predictions. For example, controller 202 may change parameters based on radar data received from the radar systems to prepare for inclement weather conditions.

In an exemplary embodiment, processor 204 executes one or more monitoring software applications and/or control software applications. A software application may produce one or more operating parameters that indicate an operating condition, and memory device 206 may be configured to store the operating parameters. For example, a history of operating parameters may be stored in memory device 206.

In some embodiments, controller 202 also includes a control interface 210, which is configured to be communicatively coupled to one or more control devices or input devices (e.g., touch screen, voice recognition hardware/software). In one embodiment, control interface 210 is configured to operate control devices including a brake to prevent unit 200 from moving. In addition or in the alternative, control interface 210 may operate a control device to adjust one or more parameters of unit 200 (e.g., polarity of magnets, strength of magnets, spring tension). In an alternative embodiment, electrical power is operated by a control device. The brake, the parameter adjuster, and the electrical power may be operated by the same control device or by multiple control devices. In the exemplary embodiment, controller 200 is configured to operate control devices to achieve a desired power output.

Figure 3:
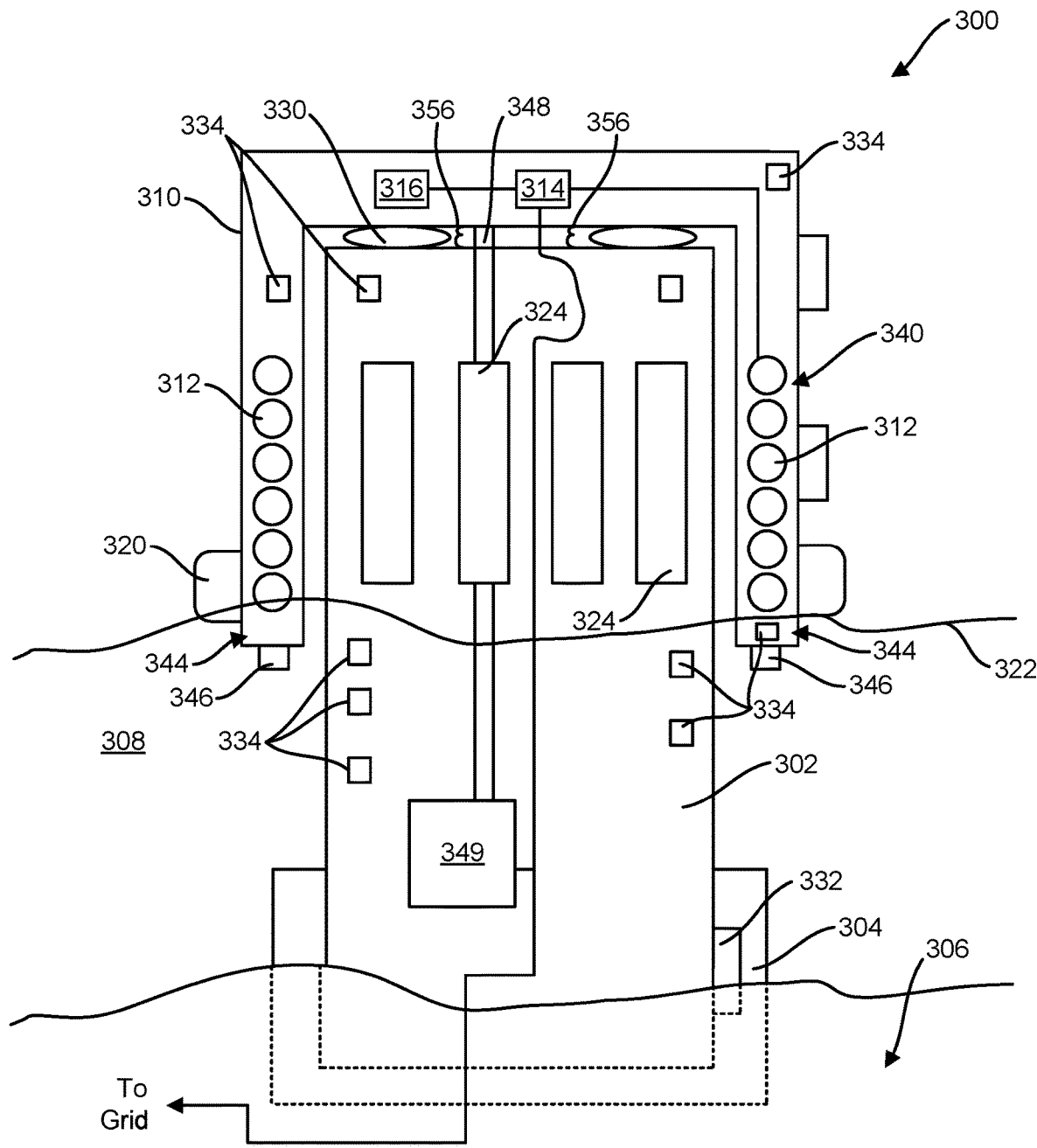
FIG. 3 is a cut-away view of an exemplary power generation unit that may be used with the system shown in FIG. 1.

FIG. 3 is a cut-away view of an exemplary power generation unit 300, such as unit 200 shown in FIGS. 1 and 2. Unit 300 includes a piling 302 adjustably coupled to a base 304 fixedly positioned in the bed or floor 306 of a body of water 308 (e.g., ocean, sea, river, canal, lake, reservoir stream, inlet, and intercostal waterway). In the exemplary embodiment, piling 302 and base 304 are fabricated from wood but can be fabricated from any material that is configured to be submersible in fluid including, but not limited to, creosote-treated wood, metal arsenate treated wood, steel, stainless steel, aluminum, concrete, reinforced concrete, and recycled plastic. Additionally, pilings 302 and base 304 can be wrapped in polyvinyl chloride (PVC), fiberglass-reinforced plastic wrap, coated in epoxy based paint, and coated in copper. Unit 300 also includes a cap 310 positioned around piling 302 and movable relative to piling 302. Cap 310 is fabricated from a polymer but can be fabricated from any material that is configured to be submersible in fluid including, but not limited to, polymer foam, creosote treated wood, metal arsenate treated wood, steel, stainless steel, aluminum, concrete, reinforced concrete, and recycled plastic. Additionally, cap 310 can be wrapped in polyvinyl chloride (PVC), fiberglass-reinforced plastic wrap, coated in epoxy based paint, and coated in copper. The power generation unit 300 can be coated with an ivermectin-laced paint for prevention of barnacle build-up on the components of the unit. The power generation unit 300 can also utilize acoustic wave/pulse and/or ultrasonic treatment techniques, as further described herein, for prevention of algae and/or barnacle build-up on the components of the unit.

In the exemplary embodiment, cap 310 includes a plurality of windings 312 or an electromagnetic coil that is coupled to a controller 314, such as controller 202 and a storage unit 316, such as storage unit 122. In the exemplary embodiment, coil or windings 312 is fabricated from copper, aluminum, and silver. Coupled to the outer portion of cap 310 is buoy 320 or inflatable device that facilitates movement of cap 310 relative to piling 302. In the exemplary embodiment, buoy 320 is manufactured and/or configured to float or rest above a waterline 322 of body 308. For example, buoy 320 includes, but is not limited to including, a tire, balloon, and inflatable member. Positioned within piling 302 is one or more magnets 324 (e.g., permanent magnet or electromagnet) to interact with windings 312. In the exemplary embodiment, magnets 324 are neodymium magnets, however, any magnet that facilitates power generation could be used including, but not limited to, iron; nickel; cobalt; iron oxide-barium/strontium carbonate ceramic; sintered aluminum, nickel, and cobalt with iron; and rare earth metals. In some embodiments, at least one cushioning component 330 is coupled to either cap 310 or piling 302 to prevent deterioration of cap 310 as cap 310 moves relative to piling 302. Cushioning component 330 can be manufactured out of any material that substantially provides cushioning including, but not limited to including, rubber and foam. In some embodiments, cushioning component 330 is aided or replaced by elements that maintain a predetermined distance between cap 310 and piling 302. For example, in such embodiments, magnetic elements are provided in cap 310 and piling 302 to attract and/or repel each other based on a predetermined distance by the desired outcome. It should be noted that the magnetic elements can be permanent magnets or electromagnetic elements that can have polarity or intensity of the magnets altered and/or changed. Additionally, cushioning component can include a component that substantially provides shock absorption including being a shock absorber, an inflatable, or have an electrostatic fluid that substantially aids in the movement in of cushioning component 330. Resilient members 356 connect the piling 302 with the cap 310. One or more resilient members 356 can return the cap 310 to the piling 302 in order to align the windings 312 with the magnets 324 to optimize the energy generation. The resilient members 356 can be tuned to the wave or impulse exciting the generator, creating a resonant system which would optimize efficiency.

In some embodiments, the windings 312 are metal wires that are wound in a spool or a circle and the magnet 324 passes along these wires. The magnet 324 can be a single magnet or multiple particles of a magnet. In some embodiments, the polarity of magnets 324 could be aligned. Additionally or alternatively, the magnet 324 could be an electromagnetic system. Since the system creates energy, the energy can be used to align the magnetic particles as the magnets 324 are in motion. Electric particles can be in a rheostatic fluid, in air, and/or in an oil-based solution so it is going around the windings 312. The magnets 324 can be a large magnet and/or multiple particles. In addition, the windings 312 themselves instead of solid windings could be particular windings, the windings could be encased in a spiral or linear or be broken into pieces allowing easier helical winding for a helical configuration (e.g., double helix configuration, etc.) as further described herein. The alignments could be in air, could be magnetic particles, or could be copper or other conductive materials and/or a composite. In some embodiments, the windings 312 are made of a biodegradable material. For example, this could be for limited use or decay over a period of time.

In some embodiments, the resilient members 356 could be springs. For example, it could be at one end or both ends to allow a device to oscillate back and forth so the magnet 324 would move back and forth between two different resilient members 356 or multiple resilient members. The resilient member 356 could be a metal spring, a rubber device, or a polymeric device. The resilient member 356 could be a metal or a magnetic device that has positive-positive polarities. For example, it would repel as it went to each end it would push the magnet 324 back in the opposite direction or change the winding. In an electromagnetic embodiment, one could turn on and off when the energy is concentrated or at either end. The resilient member 356 could be a hydraulic resilient member or a bladder. For example, one bladder could have a lower modulus of elasticity and there is a tube and a second bladder with a higher modulus of elasticity and oscillated between the two back and forth until a steady state. This could be a shock dampening effect. The resilient member could be a magnet, a first bladder, a small tube which could be adjustable to a second bladder and as the third oscillates back and forth it could be used to dramatically push or dampen flow effectively (i.e., a hydraulic-type system). In addition, it could store energy by moving fluid uphill or concentrating fluid or pressurizing fluid. It could pressurize air and fluid sublimation. It could include pushing fluid uphill to a reservoir and then the energy created throughout a typical hydraulic system as a fluid comes downhill through a small dam or through a hydraulic system, hydroelectric system compared to a simple turbine. But the energy system would allow energy to store fluid. For example, ocean water can be pushed upward into a storage reservoir or dam uphill and then energy will be created when this is released going downhill.

In operation, as movement of water level 322 rises, buoy 320 moves cap 310 upward (i.e., away from base 304). The movement of cap 310 and windings 312 relative to magnets 324 create electrical power that can be provided throughout system 100. Additionally, in the exemplary embodiment, base 304 includes a movement component 332 for moving piling 302 relative to water level 322. In such an embodiment, component 332 enables unit 300 to move relative to water and/or tide levels of the water 308. In some embodiments, component 332 moves pilings utilizing information received from sensors 334 positioned on unit 300. Sensors 334 can be any sensor that provides environmental and/or working information of unit 300 including, but not limited to including, sensors that detect wind speed, water levels, position, acceleration, torque, power, and light. The sensors 334 could also be different types of biologic sensors, implantable sensors, and the like. For example, this could be used on robotic systems inside the human body, powered micro robots, and the like. It could be powered robots that go in vascular channels (e.g., in the digestive system). The sensors 334 could be power sensors or robotic systems within the human body. Moreover, it could be powered for exoskeletons or the like. It could be a timer system that is turned on and off. This could be a particulate material flow for fluid air. In one embodiment, component 332 maintains and/moves piling 302 such that magnets 324, cap 310, and/or windings 312 are positioned a predetermined distance away from water level 322 and/or floor 306.

In an embodiment, energy storage systems described herein could compress charged particles in an increasingly tighter packed environment and then when the charged particles are released they will create energy.

Figure 4:
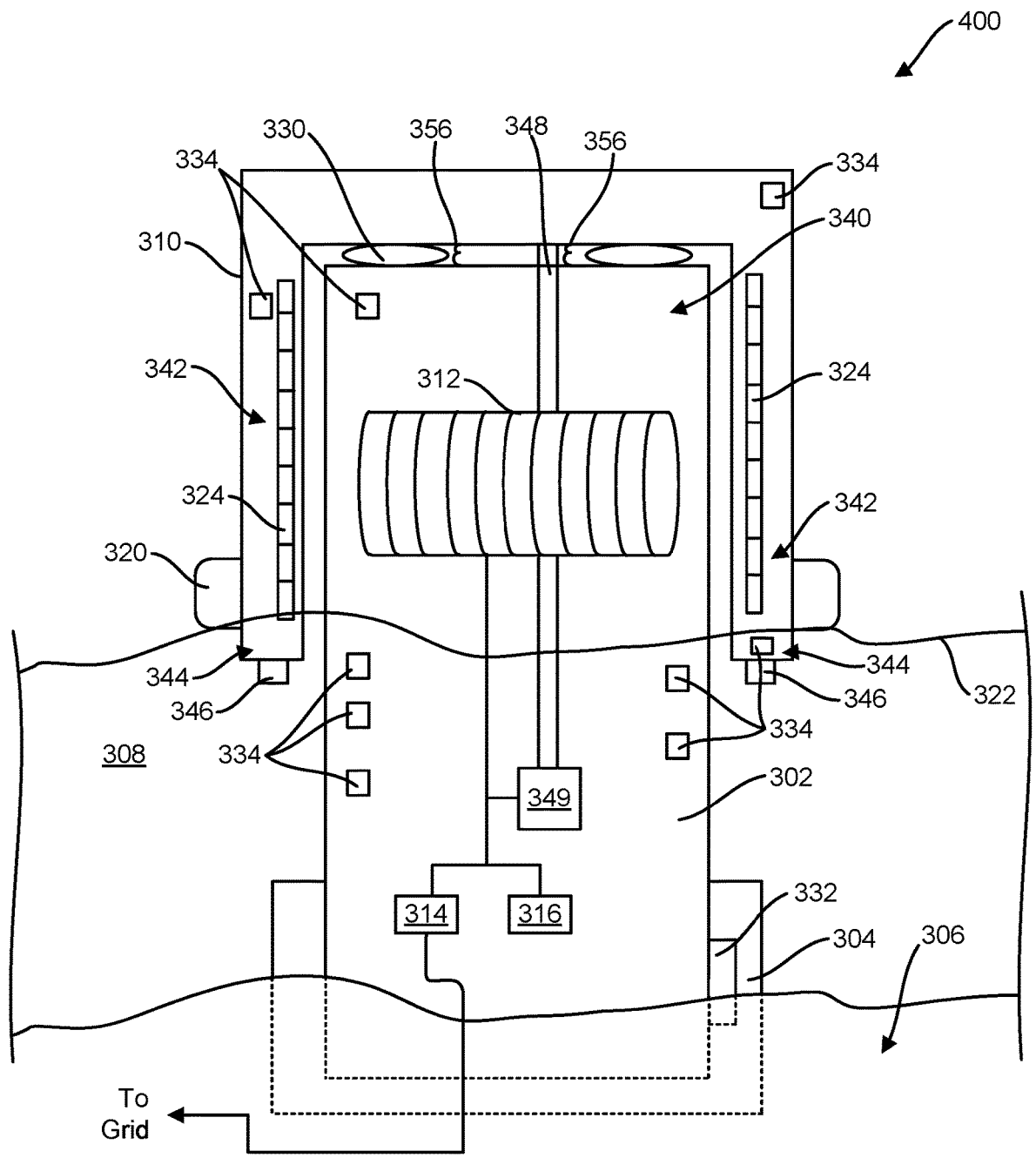
FIG. 4 is a cut-away view of an alternative power generation unit that may be used with the system shown in FIG. 1.

FIG. 4 is a cut-away view of an alternative power generation unit 400, such as unit 200 shown in FIGS. 1 and 2. It should be noted that unit 400 is substantially similar to unit 300 (shown in FIG. 3). As such, components shown in FIG. 4 are labeled with the same reference numbers used in FIG. 3.

In the exemplary embodiment, an electromagnetic core 340 is positioned within piling 302. The electromagnetic core 340 includes a conductor or windings 342 such as windings 312, shown in FIG. 3. In such an embodiment, core 340 is manufactured from silicon steel and could include permalloy, powdered iron, and ferrite. Additionally, windings are fabricated from copper, aluminum, and silver and are in the shape of a coil, spiral, or helix. Additional details regarding configuring windings in the shape of a coil, spiral, or helix are further described herein.

Positioned within the sidewalls of cap 310 are at least two magnetic assemblies 342. Each assembly 342 includes a plurality of magnets 324 stacked or positioned on each other with opposite polarities. For example, if a first magnet 324 has a polarity of NS the adjacent magnet would have a polarity of SN. It should be noted that in addition to having the properties or capabilities described above, the magnets 324, in one embodiment, are electromagnets and configured to change polarity after receiving signals from a controller 314, 202, and/or 110. It is also noted that the orientation of the windings 312 and/or the magnets 324 may be interchanged or rotated by 90 degrees.

As described above with reference to unit 300, as movement of water level 322 rises, buoy 320 moves cap 310 upward (i.e., away from base 304). The movement of cap 310 and assemblies 342 relative to core 312 create electrical power that can be provided throughout system 100.

In some embodiments, units 300 and 400 include a torsional assembly that facilitates harvesting energy from rotational movement of cap 310. In such embodiments, cap 310 includes a plurality of fluid reservoirs 344 or paddles 346 provided in and/or coupled to cap 310. In operation, fluid pushes or exerts force on fluid reservoirs 344 or paddles 346 causing cap 310 to rotate about piling 310. A shaft 348 is coupled to cap 310 and extends into piling 302 into a generator 349 that converts rotational mechanical movement of cap 310 and/or shaft 348 into usable energy that can be provided throughout system 100.

Figure 5:
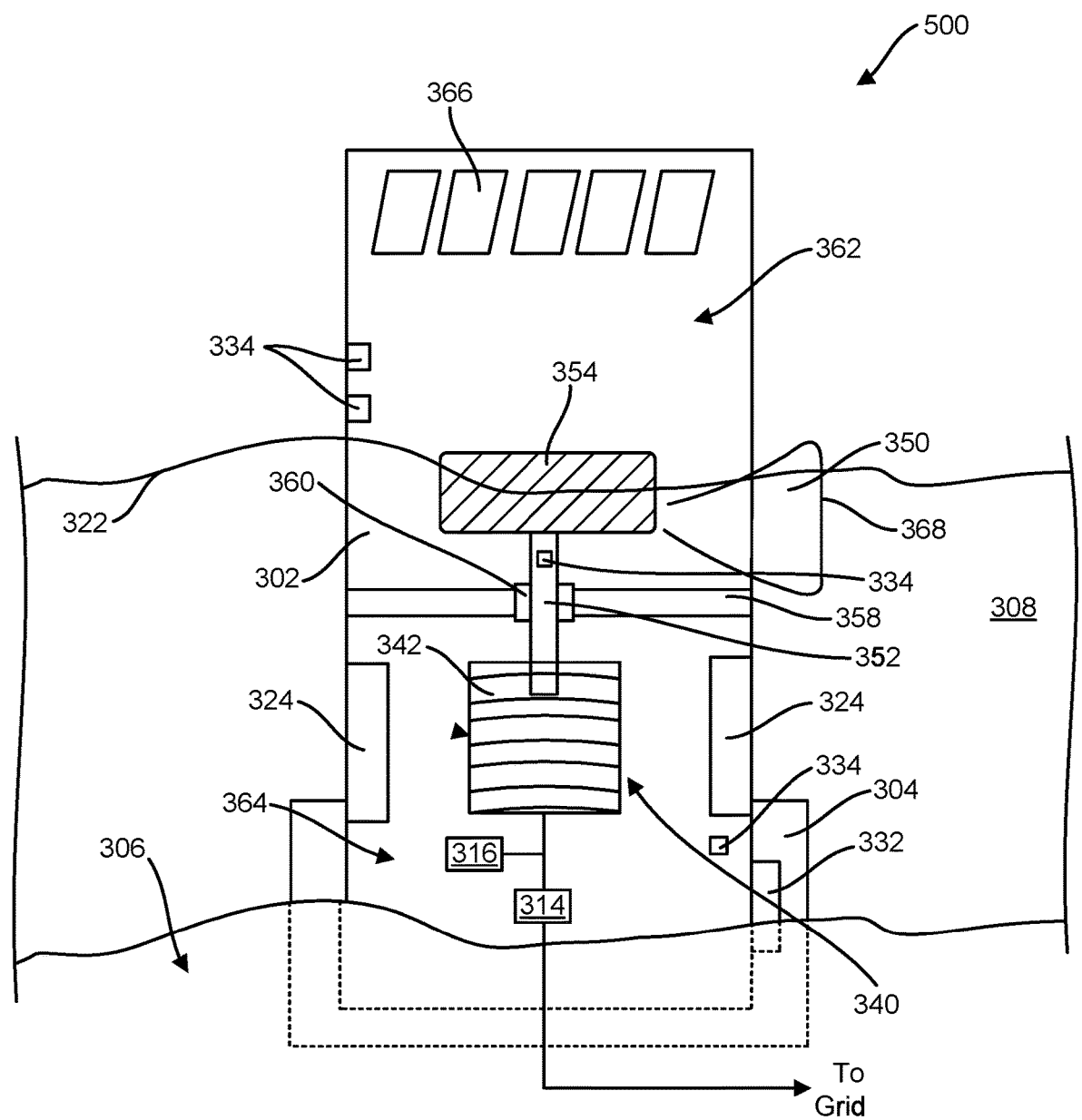
FIG. 5 is a cut-away view of an alternative power generation unit that may be used with the system shown in FIG. 1.

FIG. 5 is a cut-away view of an alternative power generation unit 500, such as unit 200 shown in FIGS. 1 and 2. It should be noted that unit 500 is substantially similar to units 300 and 400, shown in FIGS. 3 and 4. As such, components shown in FIG. 5 are labeled with the same reference numbers used in FIGS. 3 and 4.

Unit 500 includes a fluid intake valve 350 enabling the intake of fluid from body 308. Filtration device 368 in the form of a filter, screen, mesh, or similar device allowing fluid to pass and preventing debris from entering the fluid intake valve 350 is positioned at the opening of the fluid intake valve 350. Positioned within piling 302 is an electromagnetic core 340 having a conductor or windings 342 such as windings 312, shown in FIG. 3. One or more magnets 324 are fixedly coupled to piling 302 adjacent to core 340. Coupled to core 340 and extending upward (i.e., away from base 304) is a drive or shaft 352 that is coupled to an impeller 354. In the exemplary embodiment, shaft 352 and impeller 354 are fabricated from stainless steel, however, it should be noted that shaft 352 and impeller 354 could be fabricated from any material that operates in fluid including, but not limited to, aluminum, carbon fiber, fiberglass, polymer, reinforced polymer, titanium, copper, silver, steel, brass, bronze, or other metal alloy. Although described as movement up and down, this could be a free floating surface that could be both used to keep this above or below surface or a specific location on the surface such that it is more of a current or flow or spinning helical fashion rather than the movement up and down of the waves in some embodiments. As further described herein, this energy can be stored in a battery, a lithium battery, or other types of battery. Moreover, one could compress air or fluid or sublimation that could be cooled or frozen and then as it defrosts it can be a phase transformation.

In the exemplary embodiment, a divider 358 having a seal or gasket 360 surrounding shaft 352 is coupled to piling 302 between core 340 and/or magnets 324 and impeller 354 to seal core 340 and/or magnets 324 from the fluid of body 308. Thus, divider 358 creates a fluid chamber 362 and an electronics chamber 364 within piling 302. A plurality of apertures or vents 366 are formed in piling 302 to allow air and/or fluid to escape from fluid chamber 362.

In operation, fluid from body 308 enters inlet 350. The force of the fluid entering inlet 350 rotates impeller 350 causing drive 360 and/or core 340 to rotate. The rotational forces are converted to energy, which are delivered throughout system 100.

Alternatively, the electromagnetic core 340 with windings 342 could be positioned above the impeller 354 with the shaft 352 attached to the top side of the impeller 354. This would allow the reversal of the fluid chamber 362 and the electronics chamber 364 within the piling 302, resulting in the electronics chamber 364 remaining generally out of the fluid environment. The magnets 324 would then be mounted along the walls of the piling 302 at the same level as the electromagnetic core 340 and windings 342. The vents 366 could be added to the lower section of the piling 302 on the fluid chamber 362.

Figure 6:
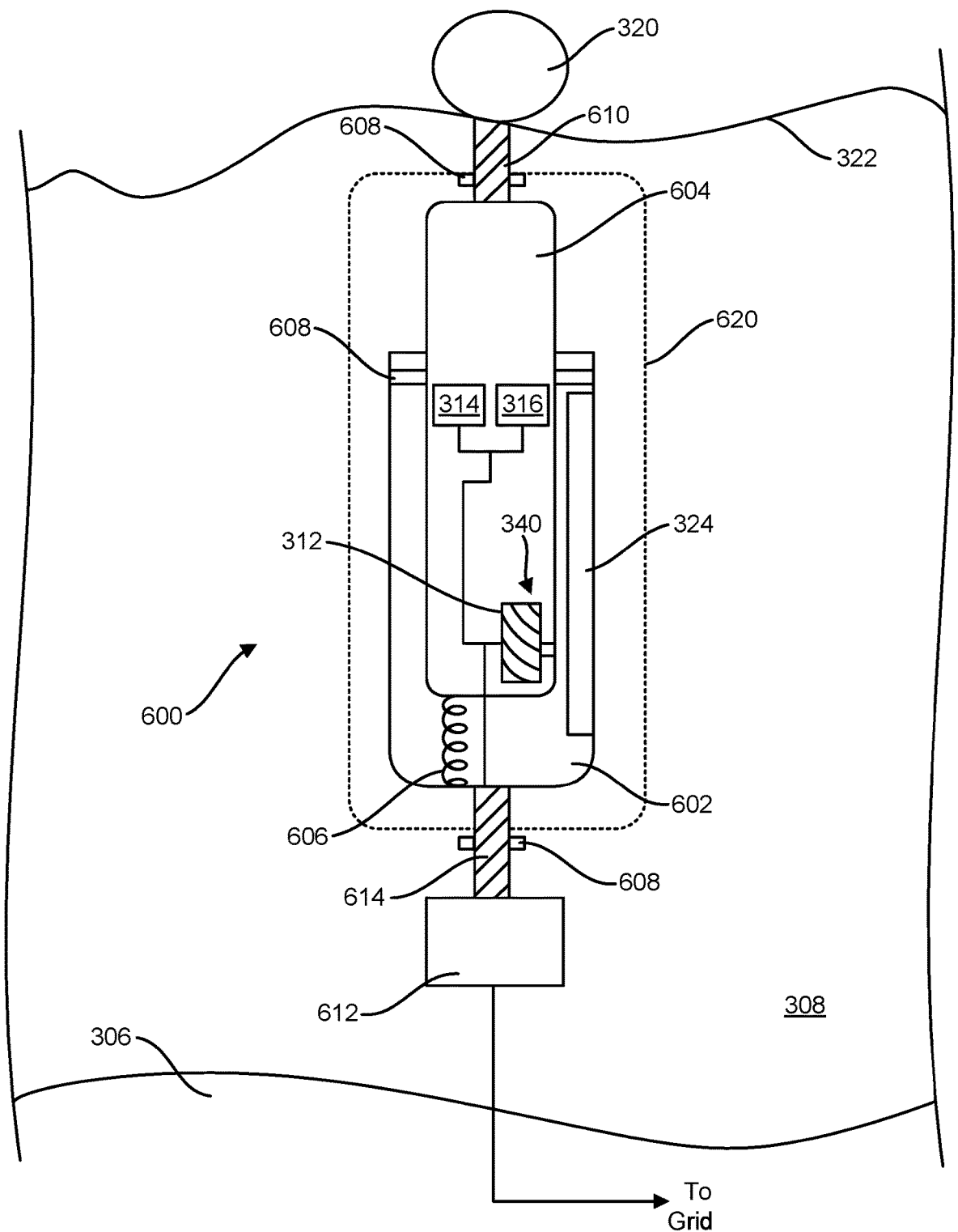
FIG. 6 is a cut-away view of an alternative power generation unit that may be used with the system shown in FIG. 1.

FIG. 6 is a cut-away view of an alternative power generation unit 600, such as unit 200 shown in FIGS. 1 and 2. Unit 600 includes an outer member 602 and an inner member 604 slidably coupled into outer member 602 via a return member 606. Return member 606 is any member that facilitates returning an item to an initial position including a spring. Coupled within outer member 602 is a gasket or seal 608 to substantially prevent fluid from body 308 from entering into outer member 602 as inner member 604 moves relative to outer member 602. In the exemplary embodiment, a magnet 324 is coupled to an interior portion of outer member 602. Likewise, an electromagnetic core 340 having a plurality of windings 312 is coupled to an inner portion of the inner member 604.

In the exemplary embodiment, inner member 604 is coupled to a buoy 320 via a tether 610 while outer member 602 is coupled to a weight 612 via tether 614. In such an embodiment, tethers 610 and 614 are fabricated from nylon rope, however, tethers 610 and 614 can be fabricated from any material that facilitates tethering of objects in fluid including, but not limited to, Urethane, aircraft cable, stainless steel cable, polypropylene rope, polyester rope, polyethylene rope, Kevlar rope, acrylic rope, and manila rope. Tethers 610 and 614 can incorporate a spring or other strain relief system to prevent damage. In some embodiments, weight 612 has a weight in water that enables buoy to rest above level 322. Alternatively, weight 612 can be positioned in floor 306 as is done with base 304. In one embodiment, unit 600 includes a housing 620 substantially encasing inner and outer members 604 and 602 between buoy 320 and weight 612. In such an embodiment, housing 620 includes a seal or gasket 608 surrounding tethers 610 and 614 to substantially prevent fluid from entering into housing 620.

In operation, as movement of water level 322 rises, buoy 320 moves inner member 604 and core 340 upward. The movement of inner member 604 relative to magnets 324 creates electrical power that can be provided throughout system 100. As inner member 604 extends upward, return member 606 retracts or returns inner member 604 to an initial position.

Figures 7, 8:
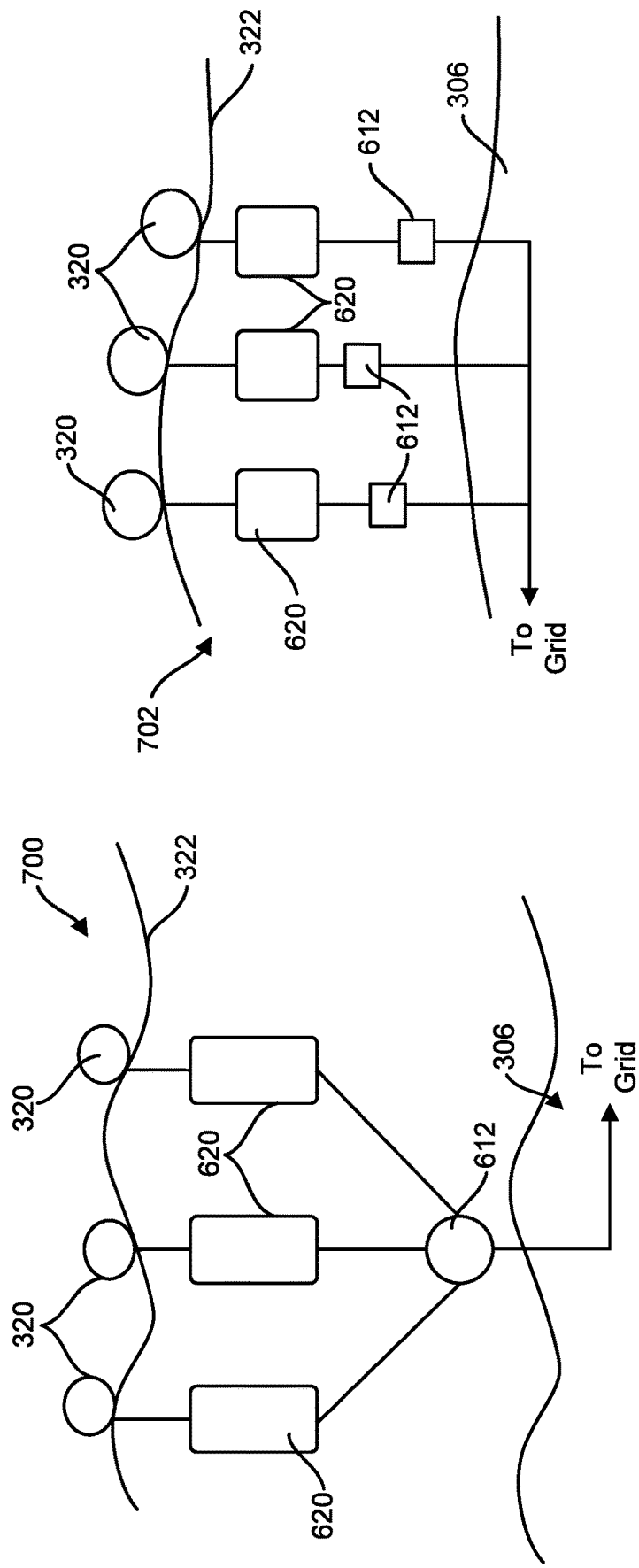
FIG. 7 is a perspective view of an array of power units that may be used with the system shown in FIG. 1.
FIG. 8 is a perspective view of an alternative array of power units that may be used with the system shown in FIG. 1.

FIGS. 7 and 8 are perspective views of a farm or array 700 and 702 of units 600, shown in FIG. 6 for use in system 100 shown in FIG. 1. In the exemplary embodiment, array 700 includes multiple units 600 tethered together utilizing a common weight 612. Alternatively, array 702 includes a plurality of units 600 tethered together via an output power line embedded or positioned in or on floor 306.

Figure 9:
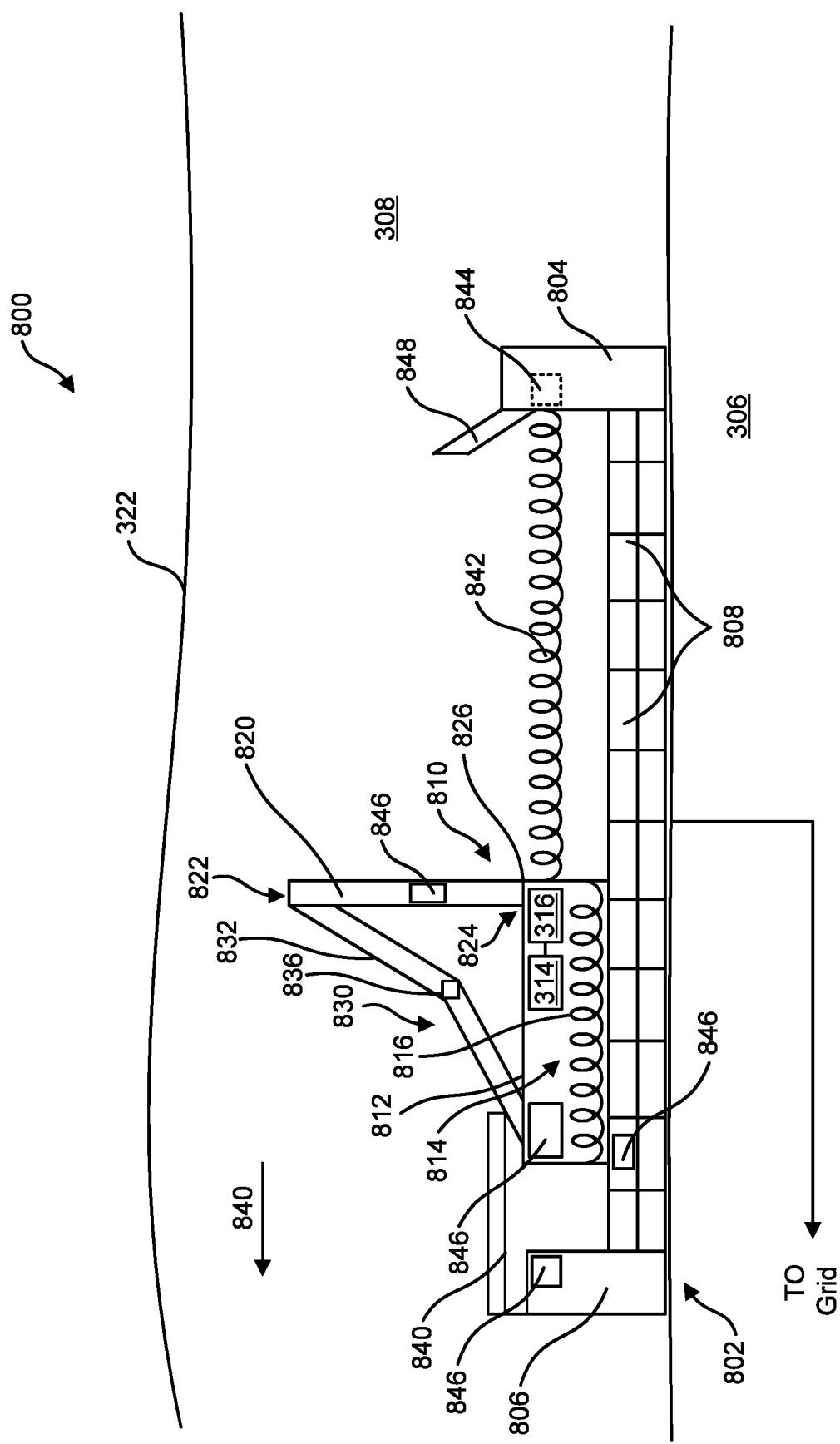
FIG. 9 is a perspective view of an alternative power generation unit that may be used with the system shown in FIG. 1.

FIG. 9 is a perspective view of a power generation unit 800, such as unit 200 shown in FIGS. 1 and 2. Unit 800 includes a base 802 having a first upright 804, a second upright 806, and a plurality of magnets 808 positioned between the first and second uprights 804 and 806. The plurality of magnets 808 are stacked or positioned on adjacent other with opposite polarities. For example, if a first magnet 808 has a polarity of NS the adjacent magnet would have a polarity of SN. It should be noted that in addition to having the properties or capabilities described above, the magnets 808, in one embodiment, are electromagnets and configured to change polarity after receiving signals from a controller 314, 202, and/or 110.

An alternator or generator assembly 810 is slidably mounted on or near magnets 808. Assembly 810 includes a housing 812 that encases a magnetic core 814 having a plurality of windings 816. In some embodiments, housing 812 encases a controller 314 and storage unit 316. A paddle or sail 820 having a top end 822 and a bottom end 824 is coupled to housing 812 via a hinge 826 at bottom end 824. Paddle or sail 820 is also coupled to housing 812 via folding member 830 at top end 822. Folding member includes a first arm 832 and a second arm 834 with a hinge member 836 positioned between the first and second arms 832 and 834.

In operation, as current of the fluid in body 308 flows in direction 840, assembly 810 is pushed by the current force on sail 820 away from first upright 804 towards second upright 806. As assembly 810 and core 814 moves across magnets, power is generated, which can be sent to grid 104 and/or storage unit 316. Additionally, as assembly 810 moves towards second upright 806, second member 834 contacts stop component 840 that is coupled to second upright 806. Stop component 840 forces folding member 830 to collapse at hinge 836, which causes paddle or sail 820 to also collapse at hinge 824.

Once assembly 810 is in a collapsed state, return member 842 returns or retracts assembly 810 to an initial position adjacent first upright 804. Non-limiting examples of return member 842 are any elastic objects that recoil including springs, rope, and line. In some embodiments, assembly 810 is returned to an initial position by a winding machine, winch, or motor that responds to signals provided by sensors 846 and/or member 842. The embodiments could include a winding machine, electromagnetic, a field, hydraulic, or the like as described herein.

In some embodiments, a formation member 848 is positioned on first upright 844. Formation member 848 is positioned and configured to force first arm 832 and paddle 820 upright to enable travel or movement by the current of body 308. In some embodiments, paddle 820 and/or folding member 830 are erected automatically by a motor responding to an indication that assembly 810 in the initial position adjacent first upright 804. While unit 800 is illustrated as being positioned within a body of water 308, unit could be utilized and/or operated by force from the wind. For example, unit 800 could be positioned on a house to generate power gained from the wind to provide to the house.

Figure 9A:
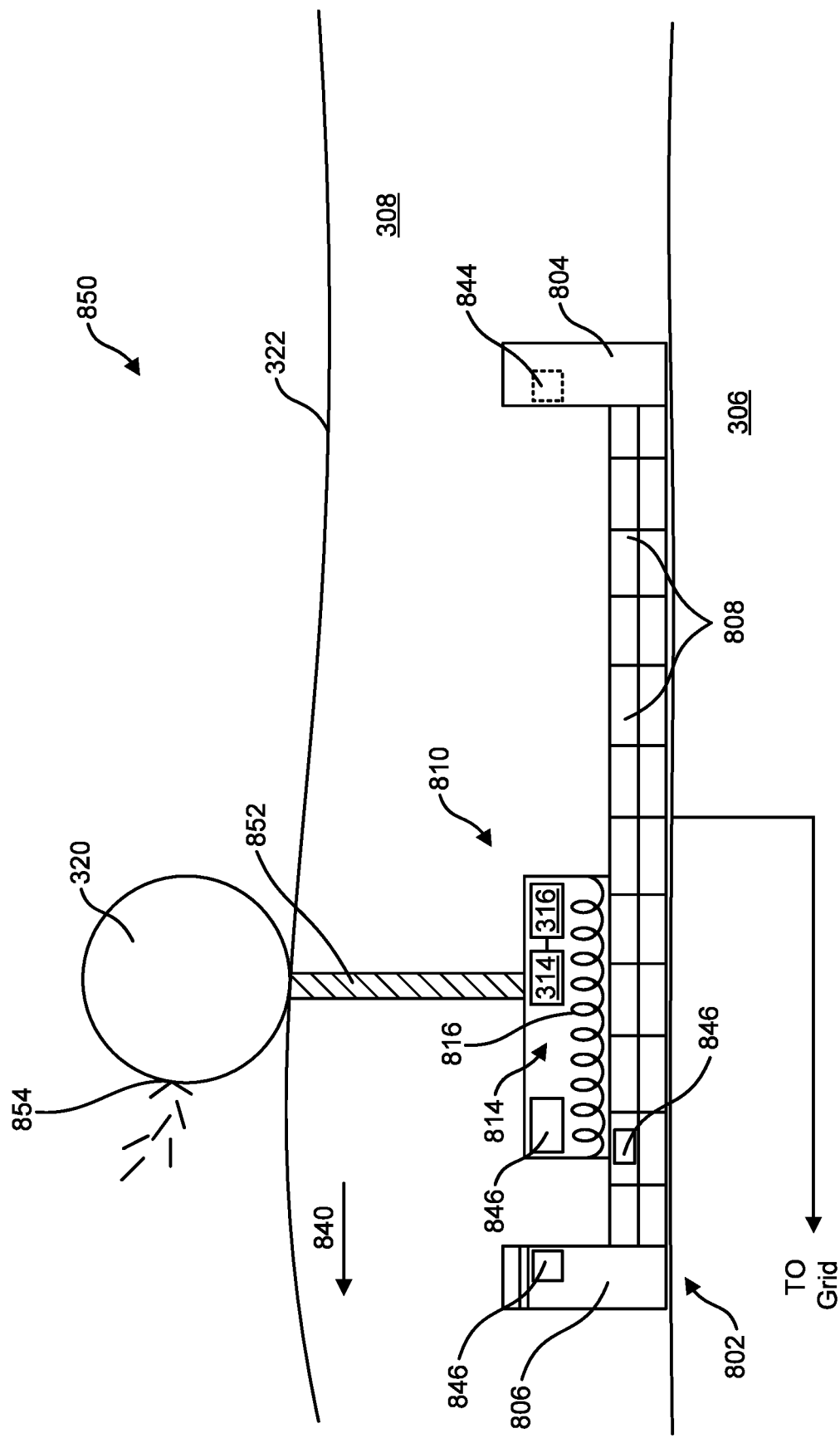
FIG. 9A is perspective view of an alternative power generation unit that may be used with the system shown in FIG. 1.

FIG. 9A is a perspective view of a power generation unit 850 that is an alternative embodiment of unit 800. In the exemplary embodiment, assembly 810 includes a substantially rigid tether 852 that couples buoy 320 and the housing of assembly 810. Tether 852 can incorporate a spring or other strain relief system to prevent damage. As fluid flow pushes buoy in direction 840, assembly 810 is moved across magnets 808 to create power. Once assembly 810 has moved into a final position against upright 806, buoy 320 can provide a force pushing assembly 810 to an initial position adjacent upright 804. In such an embodiment, buoy 320 can be forced to release gas and/or fluid from outlet 854. As such, buoy 320 can include a variable resistor such that when pressure inside bladder exceeds a predetermined capacity, the fluid inside is forced out. Alternately, a return member (e.g., return member 842 in FIG. 9, etc.) can be utilized to return or retract assembly 810 to an initial position adjacent first upright 804.

It should be noted that while FIGS. 9 and 9A are depicted with magnets 808 in base 802 and windings in assembly 810, the components could be switched providing assembly 810 with magnets 808 that move across windings 816 positioned within base 802.

Figure 10:
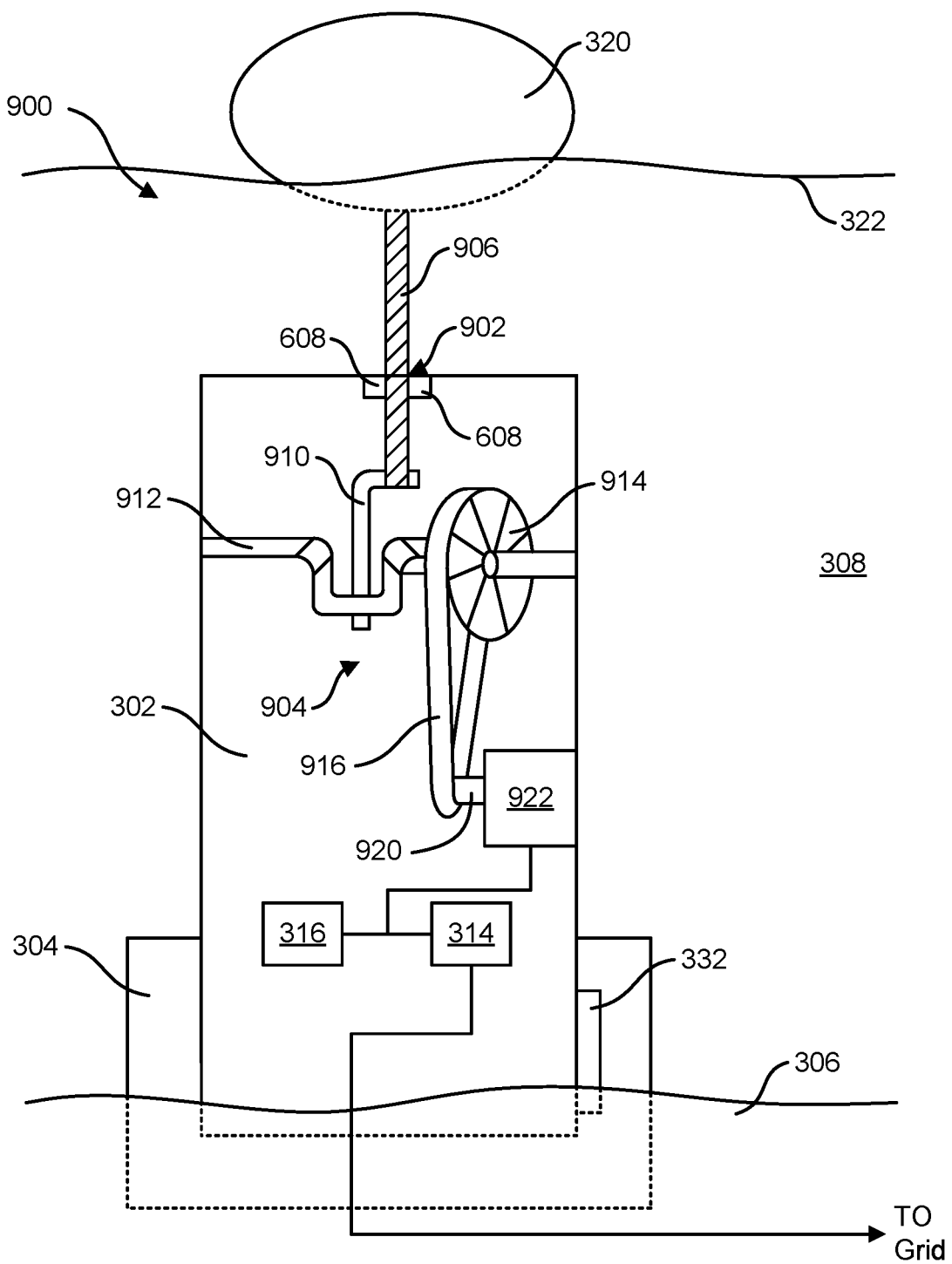
FIG. 10 is a perspective view of an alternative power generation unit that may be used with the system shown in FIG. 1.

FIG. 10 is a perspective view of an alternative power generation unit 900, such as unit 200 shown in FIGS. 1 and 2. It should be noted that unit 900 is similar to units 300, 400, 500, and 600 shown in FIGS. 3, 4, 5, and 6. As such, components shown in FIG. 9 are labeled with the same reference numbers used in FIGS. 3, 4, 5, and 6.

In the exemplary embodiment, unit 900 includes piling 302 adjustably coupled to a base 304 fixedly positioned in the bed or floor 306 of a body of water 308. A buoy 320 is positioned above water level 322 and is coupled to a transfer component 906 (e.g., tether 610) that slidably extends into piling 302 through an aperture 902 and couples to energy assembly 904. In some embodiments, gasket or seal 608 to substantially prevent fluid from body 308 from entering into piling 302. In the exemplary embodiment, transfer component 906 is substantially rigid to facilitate movement of components within energy assembly 904. Alternatively, transfer component 906 can be in any form that facilities movement of components of energy assembly 904 based on movement of buoy 320 including being flexible and rigid. Transfer component 906 can incorporate a spring or other strain relief system to prevent damage.

Energy assembly 904 includes a handle 910 that couples transfer component 906 and a crank 912 together. Crank 912 is pivotably coupled between a sidewall of piling 302 and a wheel 914. The wheel 914 includes a channel formed on the outer surface that substantially retains a belt 916. Belt 916 can be fabricated from any material that facilitates rotational movement including, but not limited to rubber, chain, and cord. In the exemplary embodiment, belt 916 is positioned around a shaft 920 of a generator 922 (e.g., generator 349) that is coupled to a sidewall or floor of piling 302.

In operation, as water level 322 changes, buoy 320 rises and/or falls causing transfer component 906 to turn handle 910 and/or crank 912. The movement of crank 912 forces wheel 914 and shaft 920 to rotate. Generator 922 then converts the mechanical or rotational force energy into electrical power that can be utilized throughout system 100.

Figure 11:
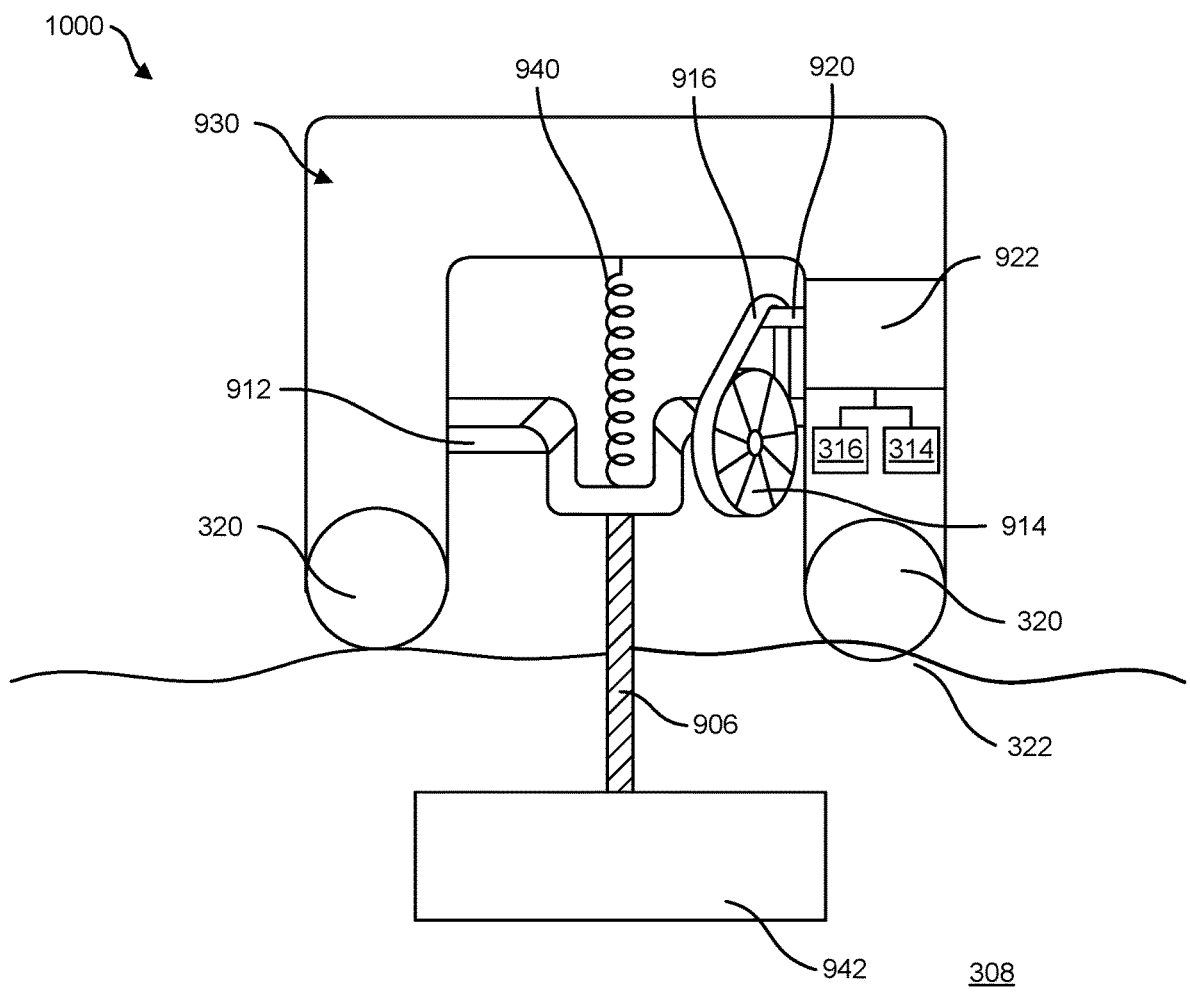
FIG. 11 is a perspective view of an alternative power generation unit that may be used with the system shown in FIG. 1.

FIG. 11 is a perspective view of an alternative power generation unit 1000, such as unit 200 shown in FIGS. 1 and 2. It should be noted that unit 1000 is similar to unit 900 shown in FIG. 10. As such, components shown in FIG. 11 are labeled with the same reference numbers used in FIG. 10. In the exemplary embodiment, unit 1000 includes buoys 320 coupled together via housing 930. A crank 912 is pivotably coupled between legs of housing 930. A resilient member 940 (e.g., spring, repelling magnets, etc.) and a transfer component 906 (e.g., tether 614) are coupled to crank 912. A weight 942, (e.g., weight 612) is coupled to transfer component 906 and positioned beneath water level 322. Transfer component 906 can incorporate a spring or other strain relief system to prevent damage.

In operation, as the wave rises the drag of weight 942 pulls spring resilient component 940 and/or crank 912 into a lower position (as depicted in FIG. 11). As the wave height lowers, the drag of weight 942 applies less force and the resilient member 940 retracts, causing the crank 912 to move into an upper position. The movement of crank 912 forces wheel 914 and belt 916 to rotate. The movement of belt 916 over shaft 920 causes movement of shaft 920 enabling generator 922 to convert the mechanical rotational force energy/movement into electrical power.

Figure 12:
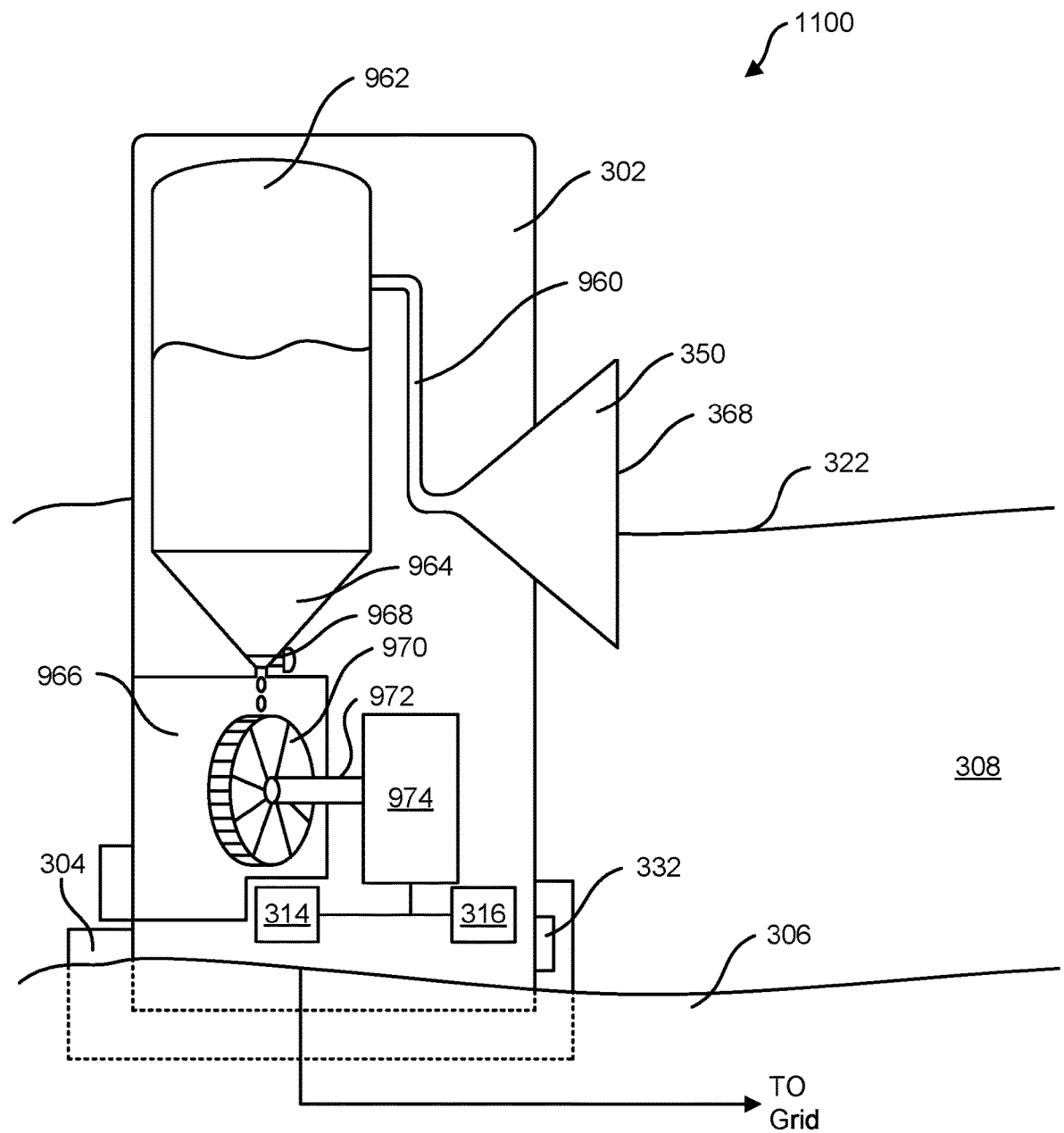
FIG. 12 is a cut-away view of a power generation unit that may be used with the system shown in FIG. 1.

FIG. 12 is a cut-away view of a power generation unit 1100, such as unit 200 shown in FIGS. 1 and 2. Unit 1100 includes an inlet 350 coupled to a fluid transfer line 960. Filtration device 368 in the form of a filter, screen, mesh, or similar device allowing fluid to pass and preventing debris from entering inlet 350 is positioned at the opening of the inlet 350. Line 960 provides fluid or flow communication between inlet 350 and fluid retention chamber 962. A funnel 964 is formed in a lower portion of chamber 962 for providing fluid into energy creation chamber 966. In one embodiment, a fluid valve 968 is positioned within and/or on funnel 964 to allow and/or prevent fluid flow from chamber 962 into chamber 966. In some embodiments, valve 968 is mechanically or electrically controlled and/or responsive to sensors located within unit 1100. Alternatively, valve 968 can be controlled remotely.

In operation, fluid stored in chamber 962 is output onto a water wheel 970 forcing movement of a shaft 972. The movement of shaft 972 enables generator 974 to convert the mechanical rotational force energy/movement into electrical power for use throughout system 100.

Figure 13:
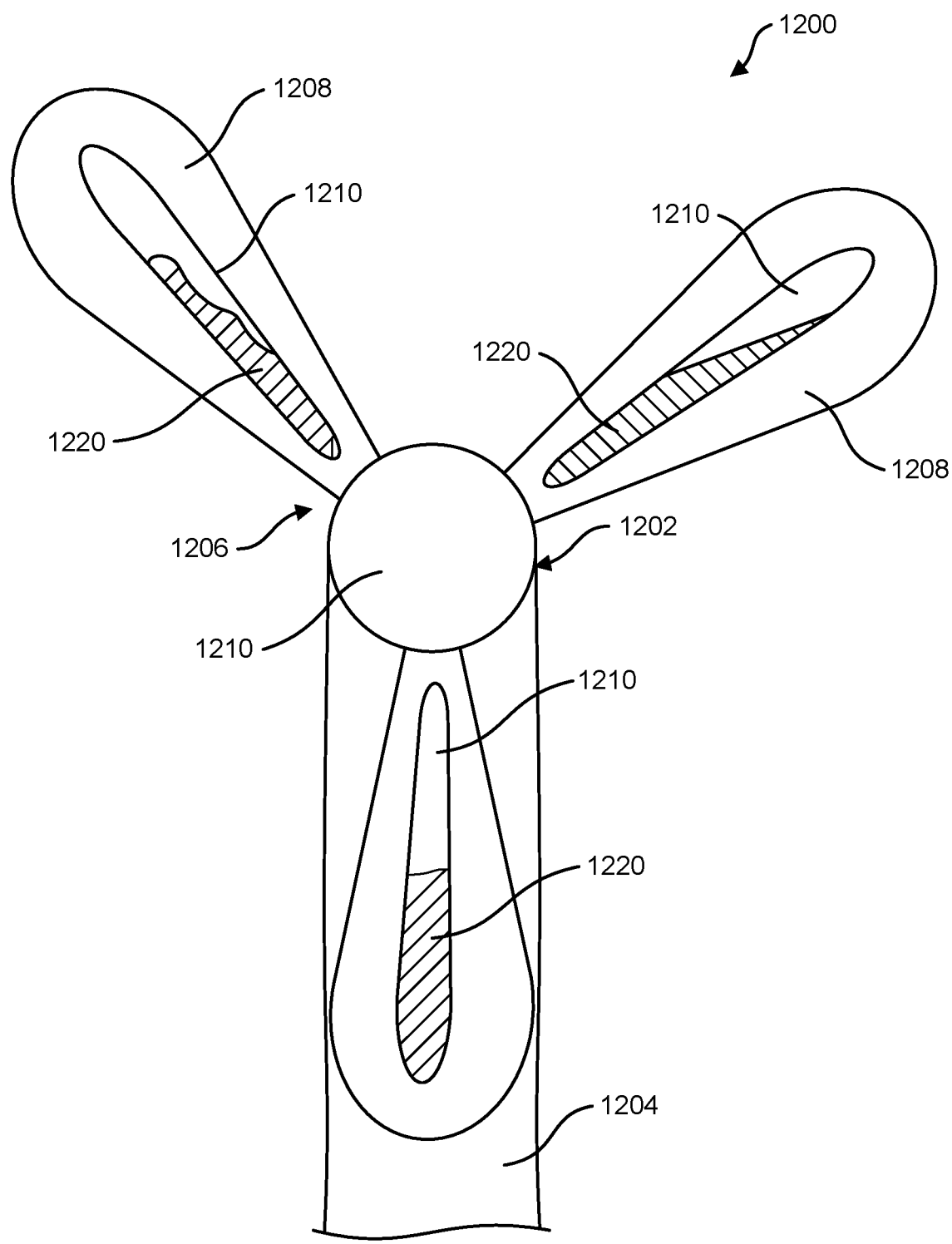
FIG. 13 is a cut-away view of a power generation unit that may be used with the system shown in FIG. 1.

FIG. 13 is a cut-away view of a power generation unit 1200, such as unit 200 shown in FIGS. 1 and 2. In the exemplary embodiment, unit 1200 is a wind turbine that includes a nacelle 1202 that houses a generator (not shown). Nacelle 1202 is mounted on a tower 1204 that may have any suitable height that facilitates operation of unit 1200. In an exemplary embodiment, unit 1200 also includes a rotor 1206 that includes three rotor blades 1208 coupled to a rotating hub 1210. Alternatively, unit 1200 may include any number of rotor blades 1208 that enable operation of unit 1200.

In the exemplary embodiment, each blade 1208 includes an assistance chamber 1210. Positioned inside chamber 1210 is a resilient member 1220. In the exemplary embodiment, resilient member 1220 is a fluid having a predetermined viscosity that facilitates movement of blades 1208 in low wind situations. Alternatively, resilient member 1220 can be substantially solid material (e.g., weight) that slides on blades and/or in chamber 1210. In some embodiments, resilient member 1220 is a spring or magnet (e.g., permanent magnet or electromagnet) that attracts and/or repels based on a position of blades 1208 relative to hub 1210.

In operation, as blades 1208 rotate around hub 1210, resilient member 1220 moves within chamber 1210 to facilitate and/or aid in the rotation of the blades 1208. As the speed of rotation increases, resilient member 1220 remains at the distal portion of chamber 1210 stabilizing rotor 1206. It should be noted that while unit 1200 is depicted as being a wind turbine, any of the components provided in unit 1200 can also be utilized in fluid environments to capture energy of fluid flow (e.g., oceans and rivers).

Figure 14:
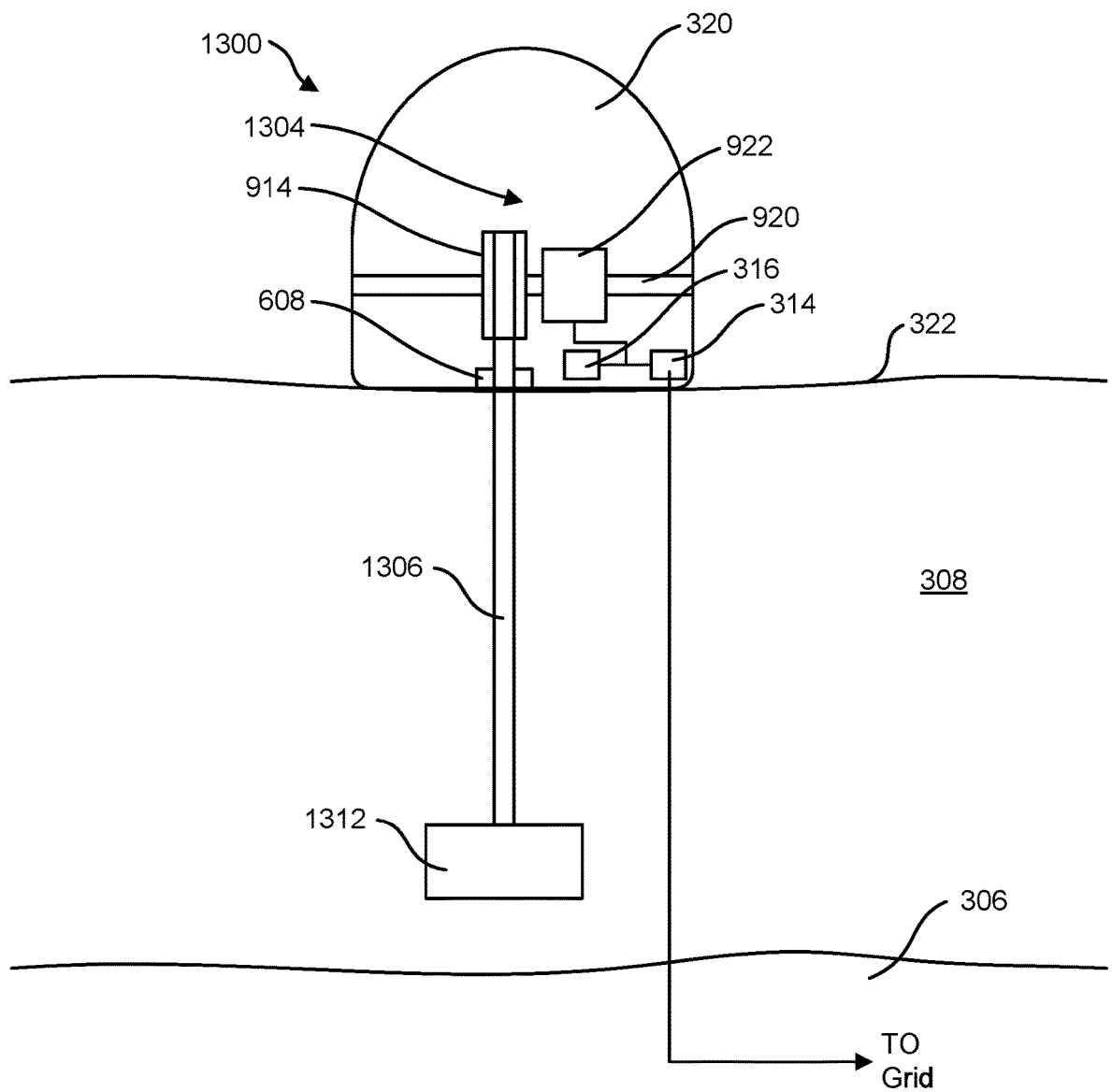
FIG. 14 is a cut-away view of a power generation unit that may be used with the system shown in FIG. 1.

FIG. 14 is a perspective view of an alternative power generation unit 1300, such as unit 200 shown in FIGS. 1 and 2. It should be noted that unit 1300 is similar to units 300, 400, 500, 600, 900, and 1000 shown in FIGS. 3, 4, 5, 6, 10, and 11. As such, components shown in FIG. 14 are labeled with the same reference numbers used in FIGS. 3, 4, 5, 6, 10, and 11.

In the exemplary embodiment, unit 1300 includes a buoy 320 positioned above water level 322 containing an energy assembly 1304 which is rotatably coupled to a transfer component 1306 attached to a weight 1312. Alternatively, the transfer component could be attached directly to the bed or floor 306 of a body of water 308. In some embodiments, gasket or seal 608 to substantially prevent fluid from body 308 from entering into buoy 320. In the exemplary embodiment, transfer component 1306 can be fabricated from any material that facilitates rotational movement including a belt, rope, chain, or cord and is substantially rigid to facilitate movement of components within energy assembly 904. Alternatively, transfer component 1306 can be in any form that facilities movement of components of energy assembly 904 based on movement of buoy 320 including being flexible and rigid. Transfer component 1306 can incorporate a spring or other strain relief system to prevent damage.

Energy assembly 904 includes a spring loaded flywheel 914 directly attached to transfer component 1306. Flywheel 914 is connected to generator 922 via shaft 920, which is coupled to the sidewalls of the buoy 320. As water level 322 rises, buoy 320 rises with the water level 322, pulling the transfer components 1306 which turns the flywheel connected via shaft 920 to cause generator 922 to convert the mechanical or rotational force energy into electrical power that can be utilized throughout system 100. As water level 322 falls, buoy 320 drops with the water level 322, the spring loaded flywheel 914 will wind up the transfer component 1306 and allow the generator 922 to free spin before the water level 322 rises again. Electrical power produced by the generator 922 can be sent to a storage unit 316 or out to the system 100.

A further embodiment of a power generation unit 200 is comprised of a rainwater generator. The rainwater generator has a repository used to collect rain and is attached to linear motor which is then attached to a spring. As the repository accumulates rainwater, the linear motor is forced downward against the spring. The rainwater is then triggered to empty from the repository and the spring forces the linear motor rapidly in the opposite direction to generate power. Alternatively, this embodiment could include a turbine to generate power.

Figure 15A:
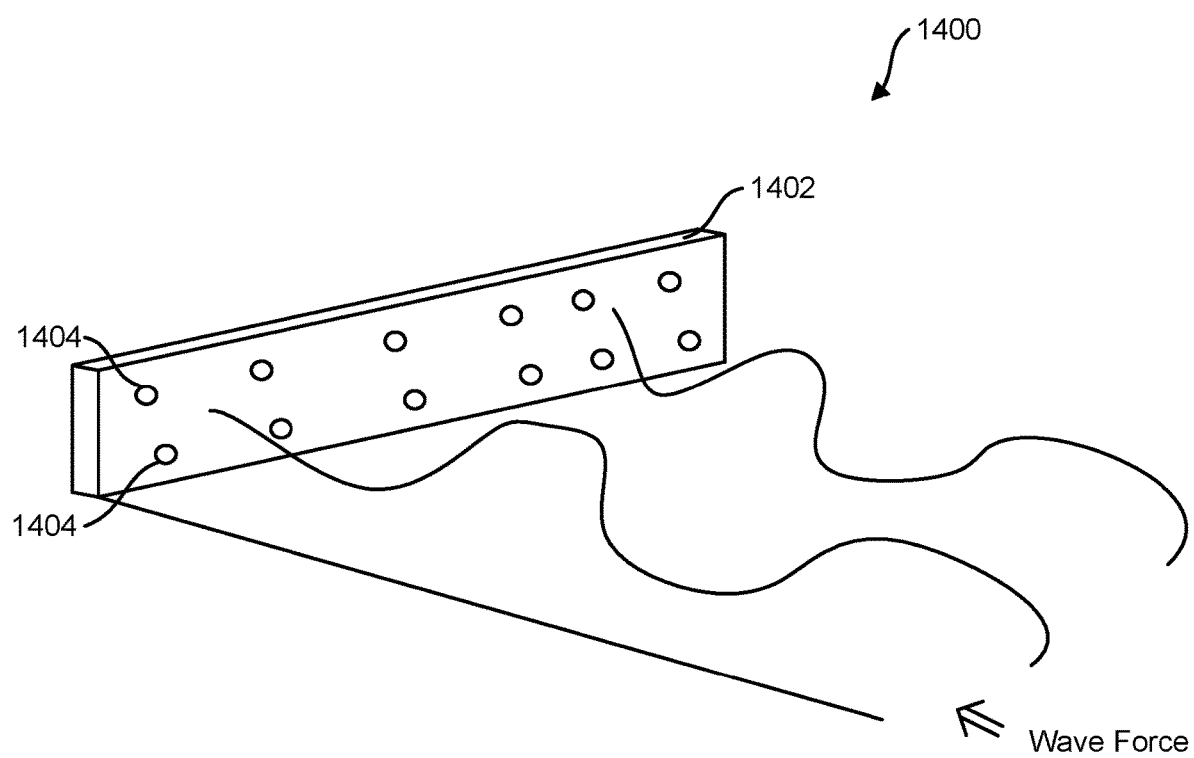
FIGS. 15A-15C are views of alternative power generation units that may be used with the system shown in FIG. 1.

FIG. 15A is a perspective view of an alternative power generation unit 1400, such as unit 200 shown in FIGS. 1 and 2, that utilizes piezoelectric transducers. In the exemplary embodiment, unit 1400 includes a wave breaking wall 1402 having one or more piezoelectric transducers (e.g., crystals) 1404 embedded therein and/or mounted thereon. The wall 1402 is configured to break waves (e.g., ocean waves, etc.) and the transducers 1404 are configured to convert the impact force of the waves to electrical energy. Unlike relying on walkers on a sidewalk, which is inconsistent, ocean waves are a reliable and constant source of energy. Moreover, the aesthetics of the wall 1402 may be limited, allowing for a cheaper and more cost-effective design compared to a sidewalk, roadway, or clothing article. Wave breaking wall 1402 can be fabricated from any material that facilitates breaking waves including, but not limited to, concrete.

Figure 15B:
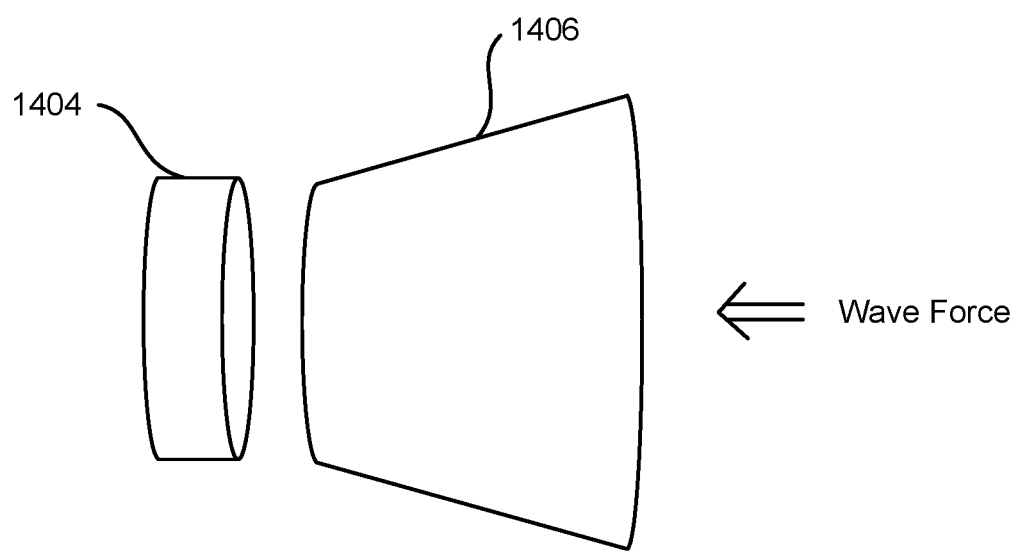

FIG. 15B is a cut-away view of a piezoelectric transducer 1404 utilizing a cone-shaped structure 1406. In the exemplary embodiment, the cone-shaped structure 1406 bottlenecks the energy generated by the waves onto the transducer 1404. Thus, the cone-shaped structure 1406 enables a large area of force to be focused in the smaller area of the transducer 1404, which maximizes the force impacting the transducer 1404.

Figure 15C:
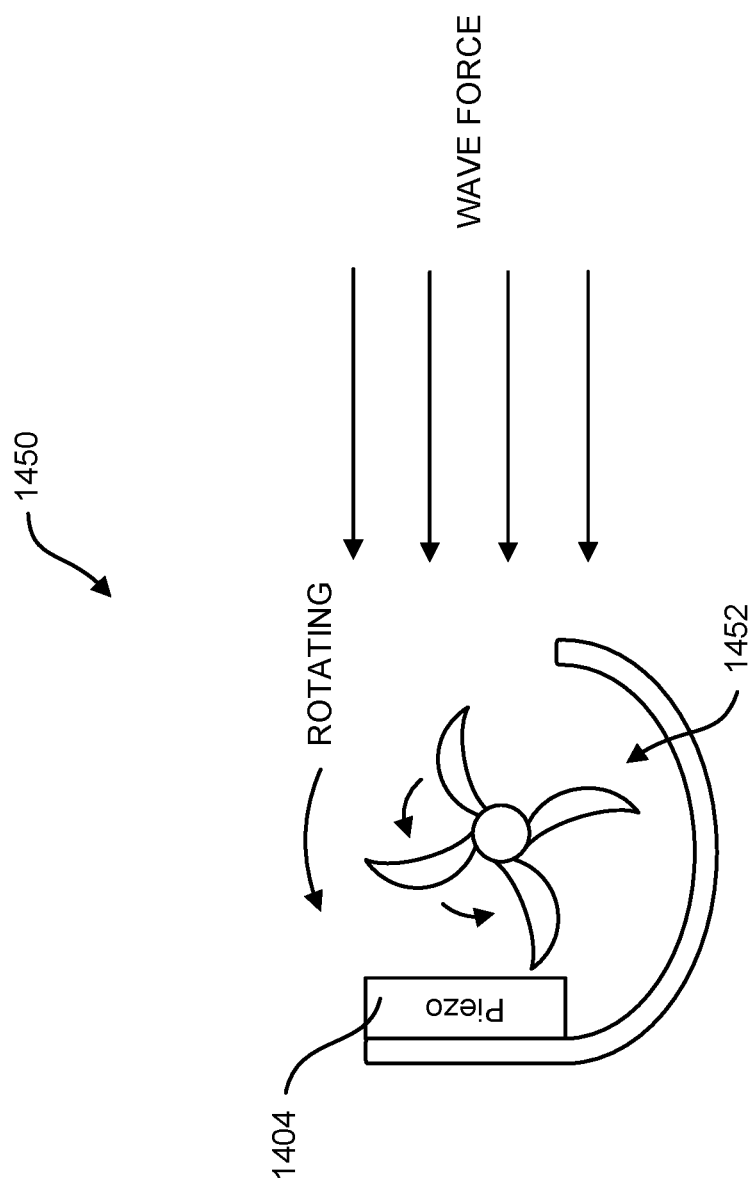

FIG. 15C is a cut-away view of a power generation unit 1450 that is an alternative embodiment of unit 1400. In the exemplary embodiment, each piezoelectric transducer 1404 assembly includes a paddle-like device 1452 that taps the piezoelectric transducer 1404 as the force of the wave causes the paddles to rotate. Thus, the paddle-like device 1452 enables multiple energy pulses to occur during each wave. In an embodiment, the paddles of paddle-like device 1452 are calibrated to rotate at a speed that matches the resonance of the piezoelectric transducers 1404. In another embodiment, the paddles of paddle-like device 1452 are calibrated to rotate at a speed that is a subharmonic of the resonance of the piezoelectric transducers 1404. In yet another embodiment, the piezoelectric assembly utilizes flexing piezoelectric crystals mounted on the ends of the paddles or fins of device 1452. As the fins spin with the incoming force of the wave, the fins hit a solid structure (e.g., wall 1402), which forces the flexible piezoelectric crystals to bend and generate energy.

Additionally, any of the units 1400, 1450 could be implemented using a gradient of ions between miniature polyacrylamide hydrogel compartments. This hydrogel would be used to create a mat that floats on or near the surface of the water. As the waves move the mat, energy is harvested. One of ordinary skill in the art will understand that this aspect could also be implemented with linear generators in tubes and/or flexible magnets, as further described herein.

Figure 16B:
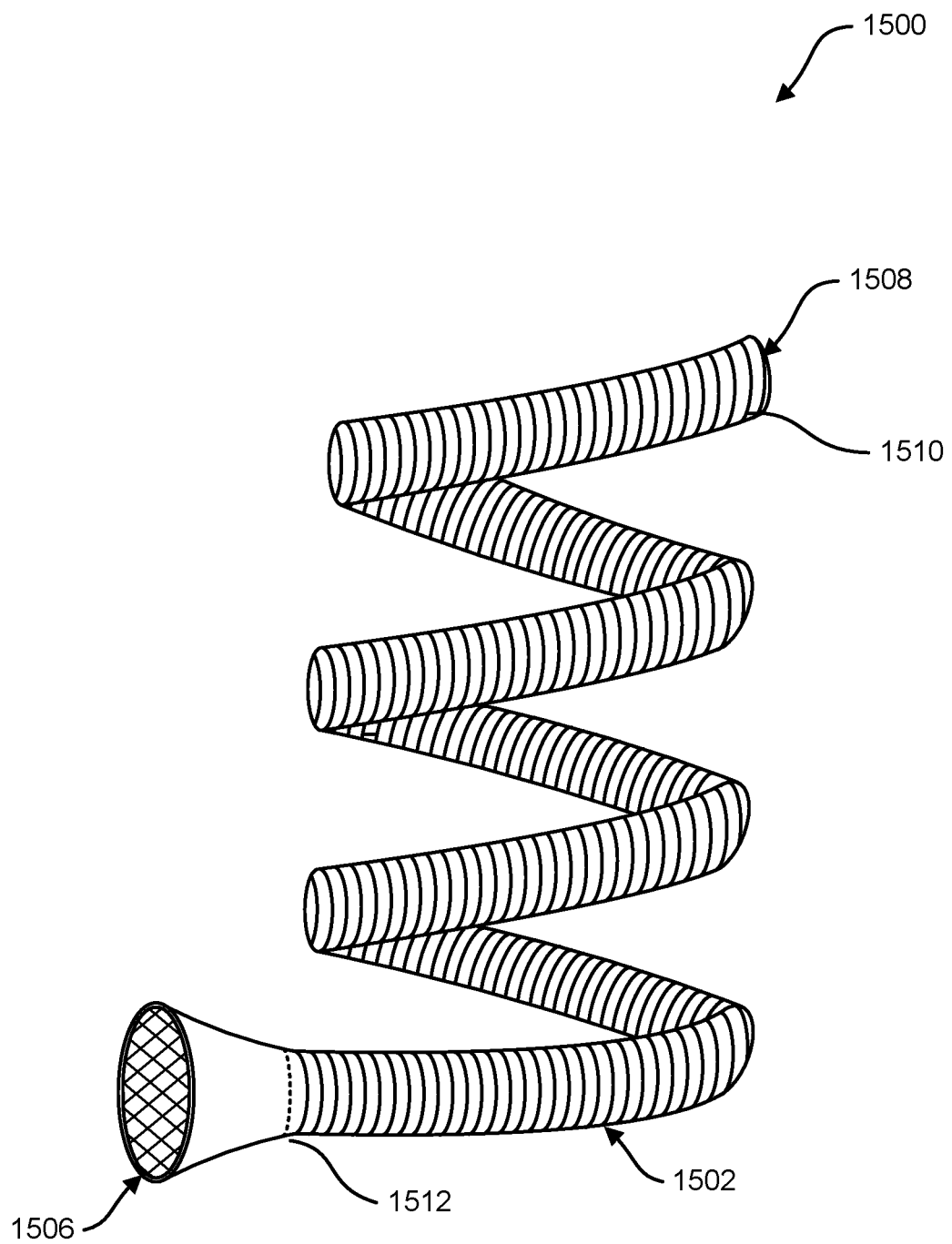

FIG. 16A is a cut-away view of a power generation unit 1500, such as unit 200 shown in FIGS. 1 and 2, that utilizes Faraday's Law. In the exemplary embodiment, unit 1500 includes windings 1502 (e.g., a coil of wire) and a movable magnet 1504. When the magnet 1504 moves, it causes a change in the magnetic field, which in turn produces current in the windings 1502 (e.g., wire). In this embodiment, the created voltage is proportional to the number of turns of wire multiplied by the change in magnetic field per second. Accordingly, configuring unit 1500 in a helix configuration, as illustrated in FIG. 16B, optimizes the number of windings and the rate at which the magnetic field changes. In this configuration, magnet 1504 is buoyant and as a wave enters an intake/outflow 1506, the water level will rise in the helically configured unit 1500, thus moving the magnet 1504 relative to the windings 1502. In this configuration, unit 1500 includes an air vent 1508 and leads 1510 configured to be electrically coupled to a load (e.g., power grid 104, etc.) and/or an energy storage device (e.g., storage units 122, etc.). The air vent 1508 is located at the top of the structure to prevent back pressure as the magnet rises. The pitch or angle of the helically configured unit 1500 may be optimized based on the expected wave speed, magnet weight, potential for electromagnetic interference between layers, or like factors. The unit 1500 also includes a magnetic stop 1512 to prevent the magnet 1504 from exiting the unit 1500 when the water flows out of intake/outflow 1506.

Figure 16C:
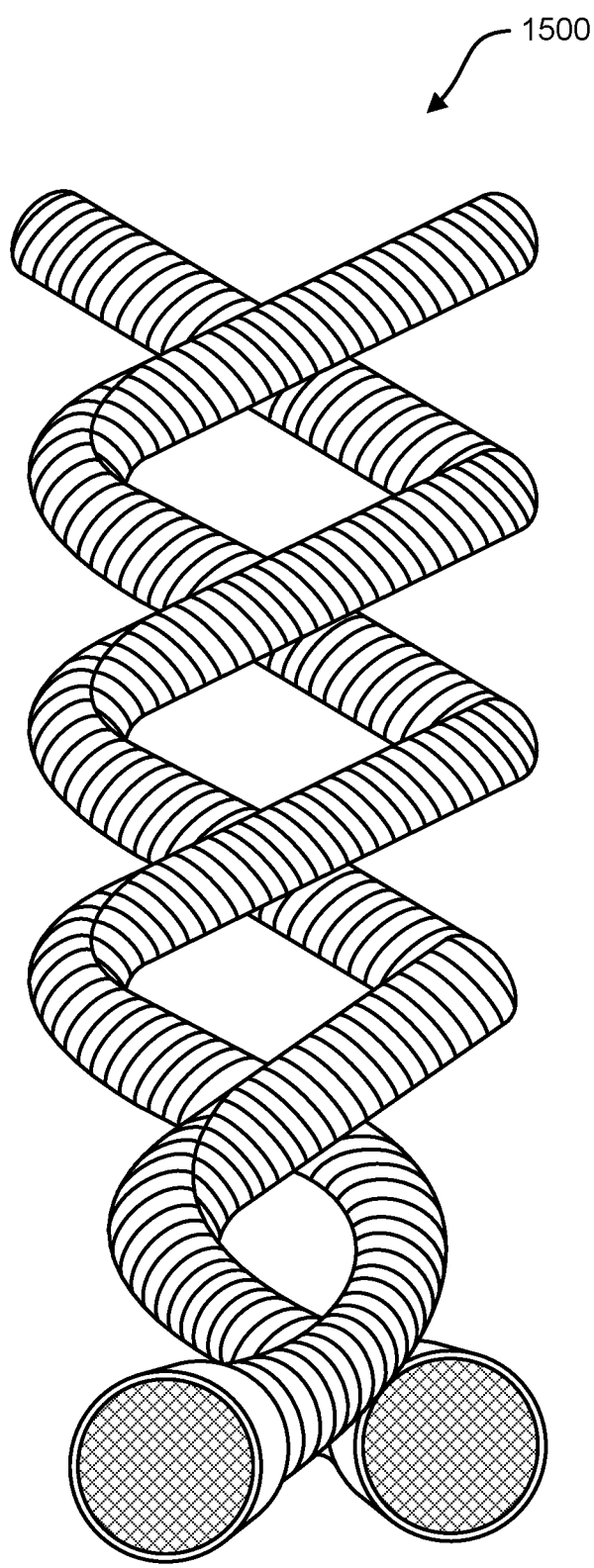
Figure 16D:
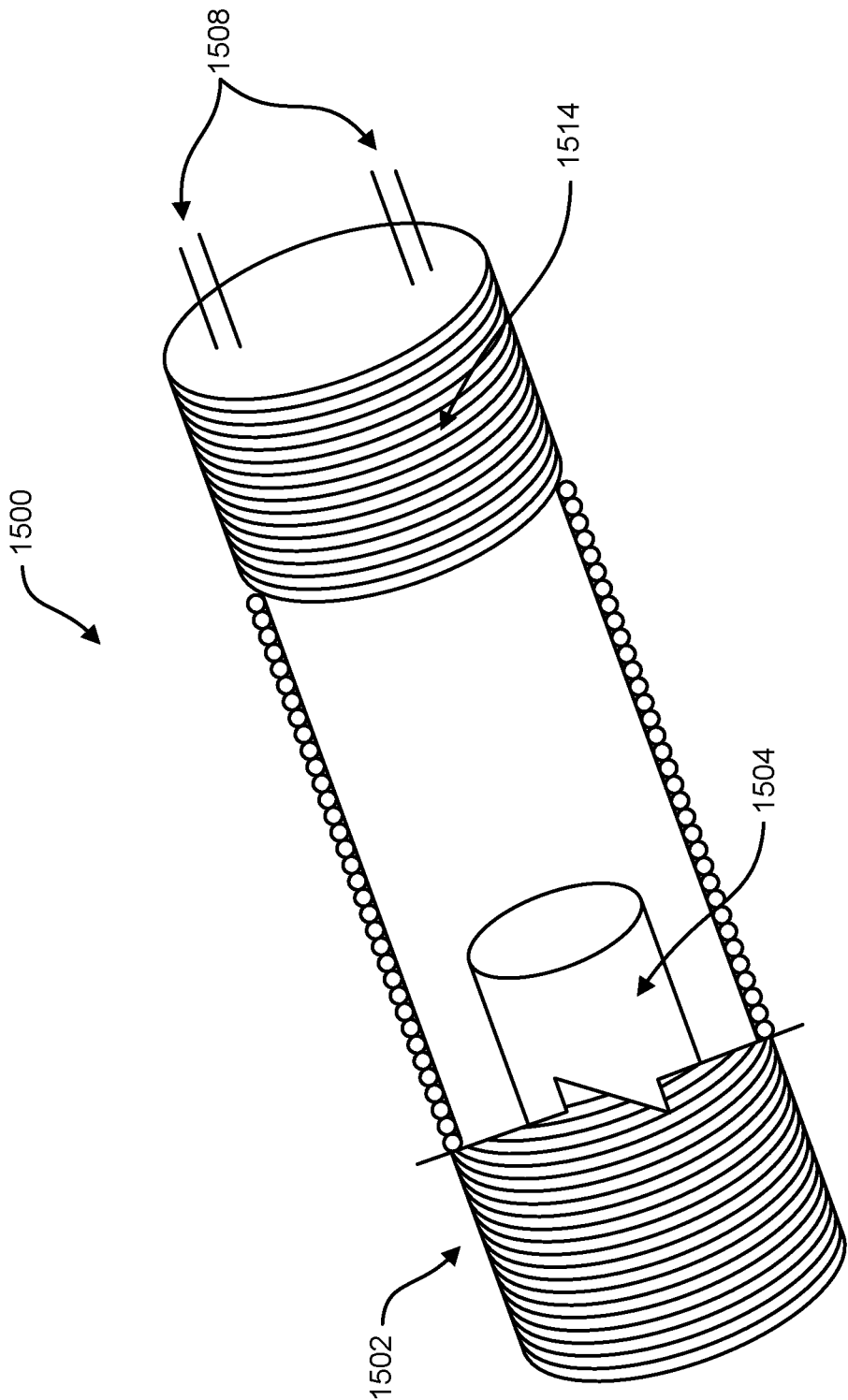
Figure 16E:
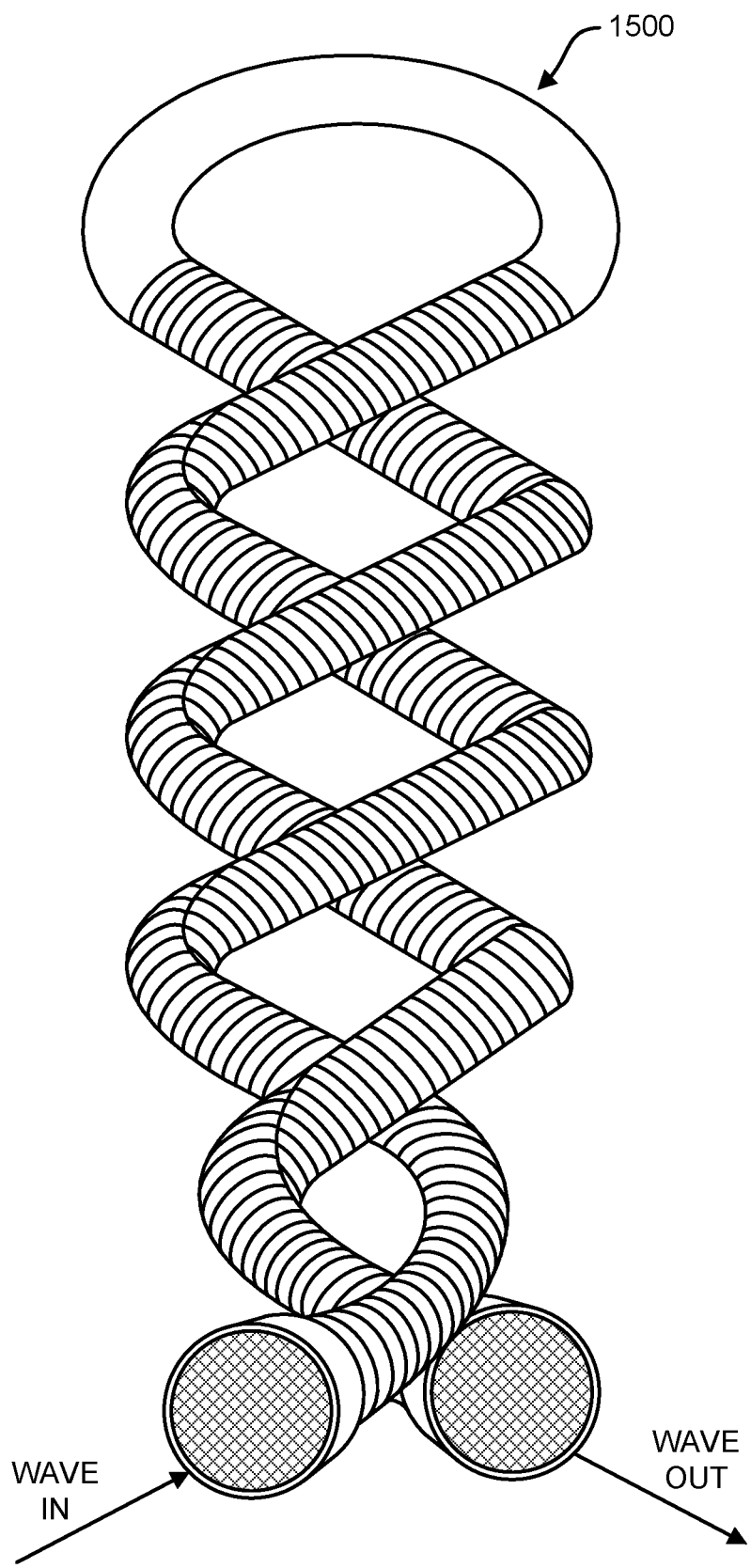

Additionally, unit 1500 may be configured to include a plurality of helical structures, such as double-helix, triple-helix, quad-helix, and the like. An exemplary double helix configuration is illustrated in FIG. 16C. These configurations may utilize a plurality of generators to maximize the amount of windings in the same area. the amount and spacing of windings may be selected to ensure there is no adverse electromagnetic interference between layers. Additionally, these configurations may include a resilient member 1514 that maximizes the return speed of the magnet 1504 when the water recedes, as illustrated in FIG. 16D. The resilient member 1514 may be located on one or both ends of unit 1500. In an embodiment, unit 1500 is tuned such that resilient members 1514 are in resonance with the incoming waves. Non-limiting examples of resilient member 1514 are a spring (e.g., coil, leave, etc.), similar polarity magnets (permanent or electromagnets) that repel, a polymer, and/or other elastic material. Additional details regarding resilient members are further described herein (e.g., resilient members 356, 606, 842, 940, 1220). In another embodiment, unit 1500 includes a combination of multiple helixes and resilient members 1514 to separate the incoming and outgoing water, as illustrated in FIG. 16E. In this configuration, the resilient member 1514 is used in the second half of the system along with an extension spring, which would return the magnet 1504 to the top position after the wave has passed. In some embodiments, the unit 1500 could be a single helix and the winding rotates a magnet that sprials on a single helix. For example, this could be a turbine in which the magnet moves in a circular fashion on the windings. Alternatively, the magnet could spiral up and down along the windings and could include a helical magnet moving around a single helix or a double helix, which could also move in a circular motion to create additional energy. In some embodiments, the unit includes a series of windings, for example a first and second series of windings through which a magnet travels between to create more (e.g., double) the amount of energy compared to a single magnet traveling around two windings. For example, those windings could be in a simple circular pattern or they could be in a spiral pattern, such as a single spiral or a double spiral. The double spiral could be linear or up and down or the double spiral could go in a circular pattern, such as an infinity symbol shaped configuration or figure eight configuration. In some embodiments, the magnet spirals around in a circular fashion and spirals around against the two helixes. These embodiments could create energy in a circular fashion not just a linear fashion. In some embodiments, the magnet spiraling around the double helix and/or moving around the double circular pattern amplifies the amount of energy created. For example, a spring or a resilient member could amplify this energy.

Alternatively, instead of the two sections of the generator being directly connected, a reservoir 1516 may be placed at the top of one or more units 1500, as illustrated in FIG. 16F. The reservoir 1516 holds water and keeps the energy as potential energy until released to the energy harvesters (e.g., units 1500). In an embodiment, the release of water from reservoir 1516 is timed to ensure that the resilient members 1514 are kept at resonance. In the illustrated embodiment, each magnet 1504 is coupled to a resilient member 1514 and suspended within windings 1502. The water is released from reservoir 1516 in pulses at the resonant frequency of resilient members 1514 to maximize displacement of the magnets 1504. As will be understood by one of ordinary skill in the art, a plurality of magnets 1504 may be used in the same system. In an embodiment, a drain 1518 is included to dispose of water after it is released from reservoir 1516 and travels through units 1500. In another embodiment, a valve 1520 is included that times the pulse of water released from reservoir 1516 and the duration to be at the resonant frequency of the resilient member 1514. Non-limiting examples of valve 1520 are an electric valve and a mechanical valve (e.g., paddlewheel, etc.). In another embodiment, a vacuum may be used instead of resilient member 1514 to return the magnet to the starting position within unit 1500.

Figure 16G:
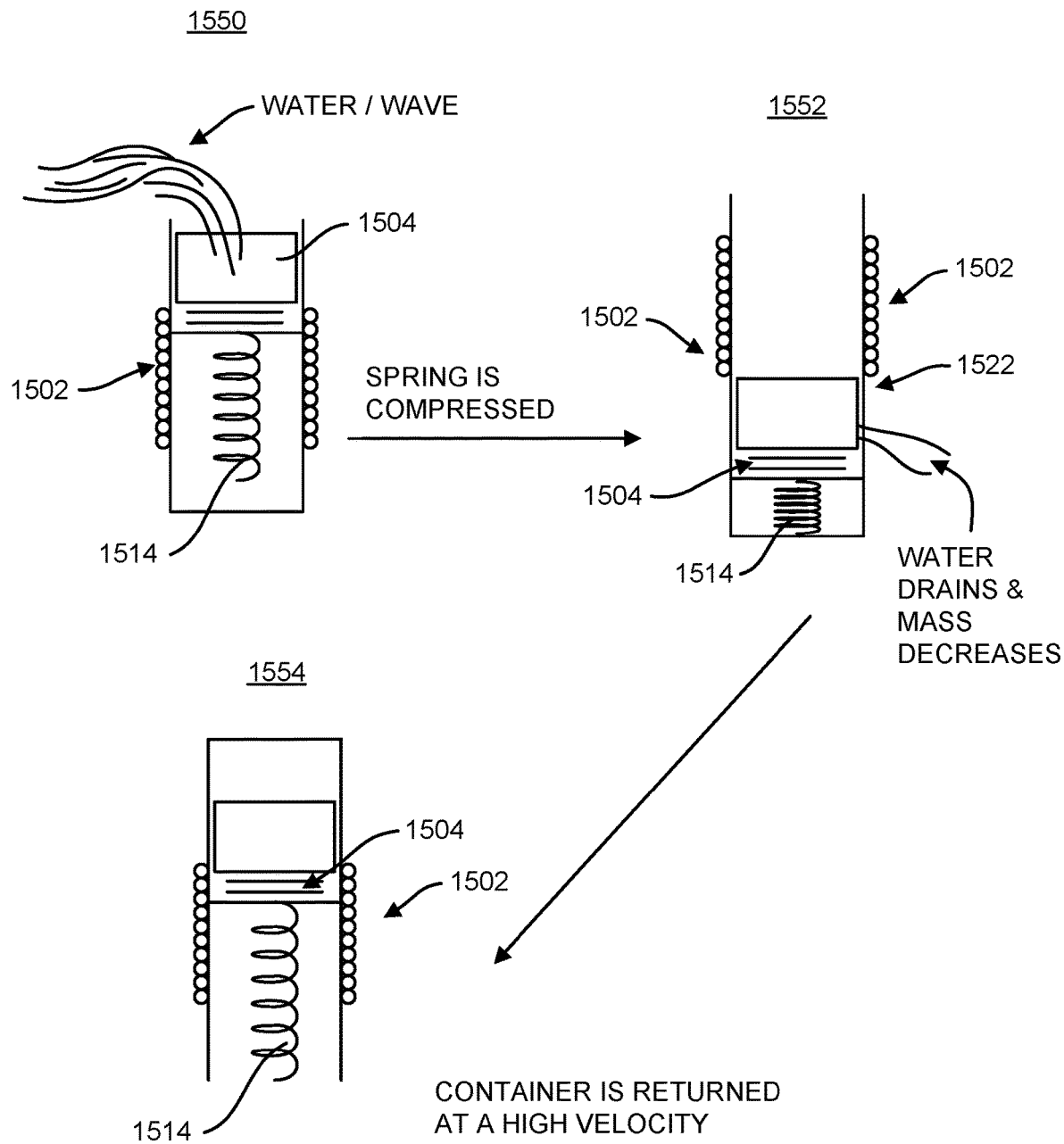
Figure 16H:
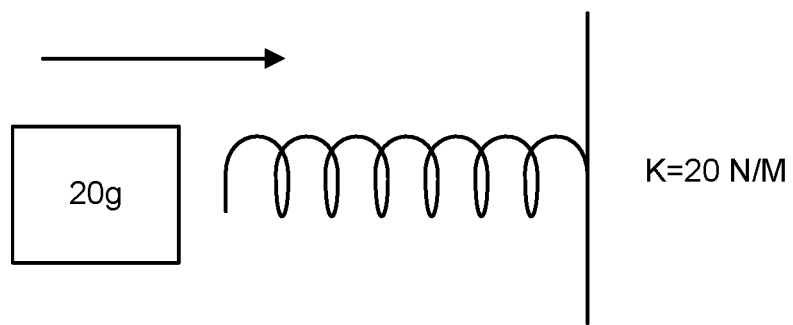

FIG. 16G illustrates power generation unit 1500 utilizing resilient member 1514 (e.g., spring). At 1550, water (e.g., ocean waves, etc.) applies pressure to magnet 1504, which compresses resilient member 1514 and causes magnet 1504 to move relative to windings 1502 and induce an electrical current therein. At 1552, resilient member 1514 is in a compressed state and magnet 1504 is held in place by a latch mechanism 1522. Upon the water draining from unit 1500 (e.g., via valve 1520, etc.), the mass applying force against magnet 1504, and thus resilient member 1514, decreases. When the latch mechanism 1522 is released, resilient member 1514 decompresses, which again causes magnet 1504 to move relevant to windings 1502 to return magnet 1504 to its original position and induce an electrical current in windings 1502, as shown at 1554. In an embodiment, the distance between the initial position of magnet 1504 when resilient member 1514 is decompressed and the position of magnet 1504 when resilient member 1514 is compressed is 0.16 meters, as illustrated in FIG. 16H and explained by the equations below. This non-limiting embodiment assumes V1 is 5 m/s, a 20 g force is applied to resilient member 1514, and resilient member has a spring constant of 20 N/m.

Figure 16I:
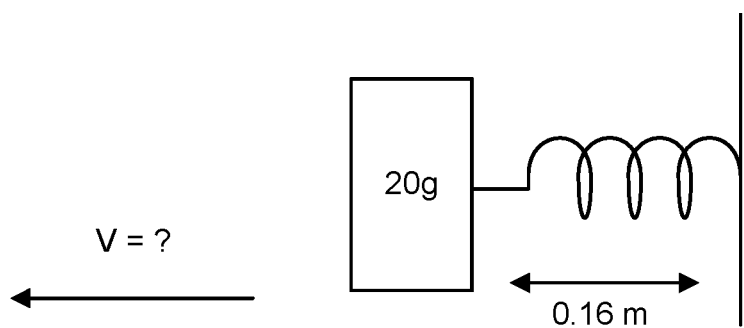

Potential Energy $(PE)$ = Kinetic Energy $(KE)$ $KE = 1/2\, m\, V_1^2$ $KE = 1/2(0.020\, g)(5\, m/s)^2$ $KE = 1/4\, J$ $PE = 1/2 kx^2$ $PE = 1/2(20\, N/m)x^2$ $PE = 10x^2$ $PE = KE$ $10x^2 = 1/4\, J$ $x = 0.16\, m$ In this non-limiting embodiment in which resilient member 1514 is compressed to PE=1/4 J, the mass is reduced to 10 g, which results in a return velocity of 7.07 m/s, as illustrated in FIG. 16I and explained by the equations below.

$PE = 1/2(20\, N/m)(0.16\, m)^2$ $PE = 1/4\, J$ $KE = PE$ $1/2(0.020\, g)(V_2)^2 = 1/4\, J$ $V_2 = 5\, m/s$ $V_1 = V_2$ (assuming frictionless system)

$V_2 = 1/2(0.10)V_2^2 = 1/4$ $V_2 = 7.07\, m/s$

It should be noted that any of the units 300, 400, 500, 600, 800, 850, 900, 1000, 1100, 1200, 1300, 1400, 1450, and 1500 may include an additional power generation unit 200 coupled to the units 300, 400, 500, 600, 800, 850, 900, 1000, 1100, 1200, 1300, 1400, 1450, and 1500 to generate additional power and/or power electronics of the units 300, 400, 500, 600, 800, 850, 900, 1000, 1100, 1200, 1300, 1400, 1450, and 1500. For example, units 300, 400, 500, 600, 800, 850, 900, 1000, 1100, 1200, 1300, 1400, 1450, and 1500 may include a solar panel or wind turbine (e.g., unit 1200) coupled to the units 300, 400, 500, 600, 800, 850, 900, 1000, 1100, 1200, 1300, 1400, 1450, and 1500. Any of the units 300, 400, 500, 600, 800, 850, 900, 1000, 1100, 1200, 1300, 1400, 1450, and 1500 may be constructed with a linear motor. In these embodiments including a linear motor, the linear motor can be a magnet 324 attached by one or more flexible tethers 610. These embodiments could be in a mesh pattern just below the fluid surface. In some embodiments, the units 300, 400, 500, 600, 800, 850, 900, 1000, 1100, 1200, 1300, 1400, 1450, and 1500 are closed systems (e.g., the parts are not exposed to water or seawater to prevent or limit rust, decay, corrosion, and degradation). For example, the windings and the magnets and electrical components are put in a sealed system and are moving back and forth in some embodiments. In some embodiments, the units utilize wireless energy transfer. For example, if there is an energy transfer with a fixed cable again the exposed portion would have to be subsequently insulated to prevent from intrusions, rust, damage, decay from mechanical and/or seawater and fluid components from rust degradation. In some embodiments, wireless energy transfer avoids degradation of components.

It should also be noted that the windings for the linear motors and/or turbines of the previously presented units 300, 400, 500, 600, 800, 850, 900, 1000, 1100, 1200, 1300, 1400, 1450, and 1500 can be comprised of copper or other metallic wires or pieces embedded in an elastomeric material which can stretch, conform, or deform to a moving or complex structure rather than rigid wire metallic windings. In another embodiment, a human body generator can be configured by placing a stretchable material over a muscle such as a quadriceps. As the muscle flexes and extends, the material is stretched, and this movement creates energy. This energy can be used to charge (e.g. provide electrical power for) implantable sensors, implantable devices such as pacemakers or pumps, and/or radiofrequency (RF) communication devices such as those that operate according to standards such as Bluetooth and Bluetooth Low Energy, for example. Additionally, a magnet inside a stretchable winding creates energy due to movement within a resilient or deformable winding as the magnet moves due to deformation or stretching. Conformable windings can be worn on the body as a sleeve or clothing, utilizing the electromagnetic fields of the skin or body to generate electricity.

Any of the units 300, 400, 500, 600, 800, 850, 900, 1000, 1100, 1200, 1300, 1400, 1450, and 1500 can be coated with an ivermectin-laced paint for prevention of barnacle build-up on the components of the unit. Furthermore, any of the units 300, 400, 500, 600, 800, 850, 900, 1000, 1100, 1200, 1300, 1400, 1450, and 1500 can utilize acoustic wave/pulse and/or ultrasonic treatment techniques, as further described herein, for prevention of algae and/or barnacle build-up on the components of the unit. Additionally, piezoelectric transducers may be implemented, as further described herein, to reduce the number of moving parts in and of the units 300, 400, 500, 600, 800, 850, 900, 1000, 1100, 1200, 1300, 1400, 1450, and 1500.

Additionally, energy provided in system 100 could be used to compress a cylinder or liquefying air (e.g., oxygen and nitrogen) or to cool water or ice to compress energy or chargers into a capacitor for later use. For example, one can compress air to create a battery by transitioning from air to fluid or from fluid to a solid. The sublimation process could be used to create a condensed or compact particle such as charged particles could be compacted further and further against each other to form a battery. Then the particles are released to charge particles that will build to entropy. Unlike typical batteries, which are confined to spaces, these could be very large batteries for storage. For example, the large space near the sea or ocean could be utilized. Additionally, energy created in system 100 can be utilized to desalinate and/or purify water. For example, it could be used in traditional external sources, homes, or the like.

Components (e.g., caps 310, resilient members 606 and 842) of the units described herein can have variable resistance and/or weight to create more energy if a current or tide is stronger or weaker depending on environmental factors (e.g., wind, moon phase, current, etc.). In some embodiments, a parachute mechanism is utilized that enables a capturing device to fill with water or wind to move or amplify effects. As it reaches a final position the capturing device could collapse and then re-inflate with movement or air.

In some embodiments, the units described herein are coupled to a repositioning device (e.g., a drone type or submersible) that is electrically powered to reposition units to optimize overall energy creation by placing units in locations with optimal environmental conditions. Energy harvested by the units described herein can be utilized to power the repositioning devices. In one embodiment, the repositioning device includes one or more solar panels positioned on the exterior of the device that enables the device to locate to an optimal location based on solar rays. In some embodiments, the units described herein create partial power to enhance movement or enhance portions of the units. For example, such systems could be used to move a boat, car, drone, a biologic system (e.g., micro robot) through a body, or the like. In some embodiments, a timer system turns on and off to control the production of energy or transfer of energy to a power grid. Energy can be stored and released to the grid if excess energy is needed. These embodiments could be coupled to other known energy producing system such as solar grids, hydroelectric, and the like. These embodiments could be used to amplify other known systems or as an adjunct to other knowns systems. Furthermore, excess energy could be stored in batteries, as further described herein. In some embodiments, the power could be used to clean surface or prepare systems or to modify materials. For example, the embodiments described herein could power an ultrasonic piezo electric system to prevent barnacle or algae formation on a boat, or ice and debris on a surface of a window or car, for example. In other exemplary embodiments, the embodiments described herein could power a drone with or without solar energy, for example.

Crossed coils having magnetic field at right angles to each other can be used to control electrical movement to the grid. As the coils are synchronized there is free electrical movement. As the coils become unsynchronized, the resistance (i.e. magnetic flux) increases, resulting in a decrease of electrical movement up to a dead short stop. Resynchronizing the coils starts electrical movement back to the grid. Additionally or alternatively, a magnetic suspension can be used to control electrical movement to the grid.

Each of the units described herein are configured to attach or couple to a watercraft (e.g., boat) to create energy rather than being in a fixed location. As such, the power generation units can be utilized with the watercrafts described in PCT/US2017/012517 to Bonutti, which is referenced by incorporation in its entirety. As described above with a repositioning device, the units coupled to a watercraft could float and move to new site or a pattern of sites to optimize energy collection based on optimal fluid movement. In some embodiments, the units described herein include external auto cleaning devices (e.g., scrubbers, ultrasound transducers, or acoustic electroshock wave generators) to remove and/or substantially prevent barnacles or debris from adhering to the units. The acoustic electroshock wave generators and/or ultrasound transducers may be used to manage fluid over and/or on a surface (e.g., boats, storage tanks, aluminum surfaces, etc.). As such, the acoustic electroshock wave generators and/or ultrasound transducers can be utilized actively modulate the drag experienced by the units, such as via techniques described in U.S. Pat. No. 6,824,108 to Bonutti, which is referenced by incorporation in its entirety. The acoustic electroshock wave generators and/or ultrasound transducers may be combined with other treatment techniques, such as thermal treatment, microwaves, optical (e.g., laser, etc.), or the like. Moreover, the acoustic electroshock wave generators and/or ultrasound transducers may be combined with chemical techniques to alter the pH locally as well as fluid pressure, such as with water pump or water jet cutter to enhance either removal or deposition of materials onto a surface. In an embodiment, the electroshock wave generators and/or ultrasound transducers may operate at one frequency to prevent barnacle formation and another frequency to prevent algae formation, for example.

In an embodiment, the acoustic electroshock wave generators and/or ultrasound transducers are used to remove barnacles and/or debris from the surface of a boat hull, for example. If the boat hull is aluminum, one or more transducers can be placed on the hull. Regularly applied acoustic electroshock waves and/or ultrasound frequencies would prevent barnacles, algae, or other formation on the surface of an aluminum body. In an embodiment, ultrasound transducers are embedded into an aluminum surface (e.g., boat hull, pontoon, etc.). In a non-limiting example, one or more ultrasound transducers are placed at one or multiple locations along the surface of a boat hull. The transducers would be oscillated or ultrasonically turned on at specific times and/or frequencies, such as once every hour or once every day, to vibrate and prevent formations such as barnacles and algae along the surface of a boat hull, along the surface of a piling, along a Jetty, or any fixed structure that is in water. For materials that are lossy and/or have a low speed of sound (e.g., fiberglass, steel, or other materials that have poor wave propagation) a manual device may be utilized. For example, a scuba diver may slide the device across a boat hull ultrasonically in increments to remove barnacles or debris from surfaces of a gel coat, boat hull, fixed object in the water, piling, or the like. Alternatively, this is accomplished with a device having a suction mechanism and moving along the surface of a vehicle or vessel. In a non-limiting example, the device could be attached to the surface, suctioned, and slid along the surface of a hull with treatments at certain intervals, such as daily, weekly, or monthly, for example. The device is configured to slide across portions of the vehicle or vessel to remove any existing debris and/or prevent any future debris from forming. The device may be operated manually or robotically. The device may be pneumatically suctioned to the vehicle or vessel and/or magnetically affixed to the vehicle or vessel. In an embodiment, the device is slid along the surface of the vehicle or vessel via rollers that stop at certain increments for the device to treat the surface and then move on to the next increment. In a non-limiting example, the device stops for a period of time (e.g., one or two seconds, etc.) to create vibratory energy and then moves on to the next section of the surface.

In another embodiment, the acoustic electroshock wave generators and/or ultrasound transducers are used to treat internal combustion engines and/or any hydraulic, pneumatic, and/or fluid flow systems. For example, when a vehicle has a fluid flow system, if the gasoline is impure, deposits could develop along either the fluid lines or in the engine itself, manifolds, pistons, intake/exhaust valves. The acoustic electroshock wave generators and/or ultrasound transducers could be oscillated at certain frequencies to break up the debris and rinse and/or wash it out so it would not need to be done manually.

In yet another embodiment, the acoustic electroshock wave generators and/or ultrasound transducers are used to prevent and/or dislodge formations on aspects of vehicles. As ice, rain, and/or debris falls, it may bond to surfaces of a vehicle, such as windows, metallic surfaces, body portions, hulls, or the like. The acoustic electroshock wave generators and/or ultrasound transducers could be oscillated to remove and/or prevent ice and/or other materials from bonding, forming, and/or sticking to surfaces of a vehicle (e.g., window, body portion, hull, etc.). Decreasing debris on hulls and/or body portions enables the vehicles to be more fuel efficient because of reduced drag.

In another embodiment, the acoustic electroshock wave generators and/or ultrasound transducers are used for cleaning and/or sterilizing water. As fluid flows through tubing, piping, sewage lines, and the like, they over time suffer from build-up, clogs, and the like. In an embodiment, the acoustic electroshock wave generators and/or ultrasound transducers comprise a device configured to move through tubing, piping, sewage lines, and the like. In a non-limiting example, the device includes a light source and camera to enable visualization of the build-up. The device may be robotic, controlled by an external controller, remotely controlled, or controlled via local surface management. The device travels through tubing, piping, sewage lines, and the like at certain intervals. For example, the device may clean out all the pipes in a house carrying water into or out of the house, reducing or removing stains, minerals deposited along copper tubing or along PVC/plastic tubing for example. In an embodiment, the device is used to clean sections in which there are angles or bends in tubing, piping, sewage lines, and the like. In an embodiment, the device contours to surfaces (e.g., interior surfaces, exterior surfaces) of tubing, piping, sewage lines, and the like and vibrates the surface to dislodge debris.

In yet another embodiment, the acoustic electroshock wave generators and/or ultrasound transducers are used as treatment to enhance deposition of materials (e.g., paints, solvents, liquefiers, etc.) onto surfaces (e.g., of walls, boats, airplane wings, etc.). Vibrating the surface to which the materials are deposited such that the spray surfaces has not only direct pressure but also vibratory pressure, the material would have a more consistent flow and/or surface bonding characteristics. Locating the ultrasound transducer on the surface onto which materials are deposited enables treating the surface by vibrating the material and then applying pressure to paint the surface, which results in a more effective/efficient technique to adhere and create a uniform layer of material. This is especially important for complex coating such as metals, for example titanium nitrate. The acoustic electroshock wave generators and/or ultrasound transducers are used to oscillate and/or vibrate transducers, electrical chips, computers, and the like having nitrate coatings applied thereto while the coating is being applied such as via pressure, heat, laser, thermal, center deposition, and/or 3D printing.

In another embodiment, the acoustic electroshock wave generators and/or ultrasound transducers are used to improve the adherence or formation of organs manufactured via additive manufacturing (e.g., 3D printing) techniques. The acoustic electroshock wave generators and/or ultrasound transducers vibrate the material being laid down to enhance the ability to layer it down in a specific pattern and/or control the thickness of the coating or 3D printing as well as the material that is printed. In an embodiment, the substrate is vibrated during the additive manufacturing process.

Figure 17:
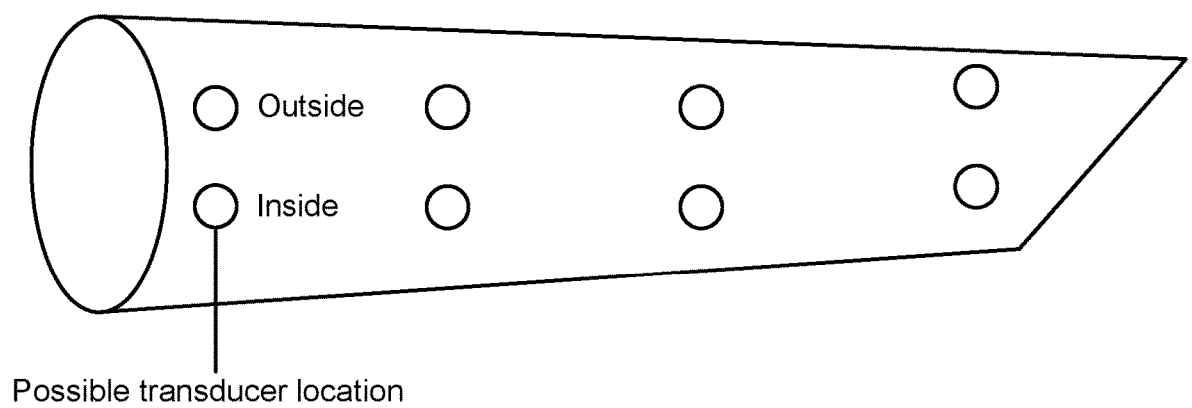
FIG. 17 illustrates a plurality of transducers in an array focused at a treatment site that may be used with the system shown in FIG. 1.

FIG. 17 illustrates another embodiment in which a plurality of transducers in an array are focused at a treatment site with different transducers outputting different frequencies such that the intersection of the multiple beams creates a different frequency of the desired treatment signal. Alternatively, a plurality of discrete transducers can be used in this configuration instead of an array. In an embodiment, sensors are placed at the transducer to ensure overheating does not occur.

Figure 18A:
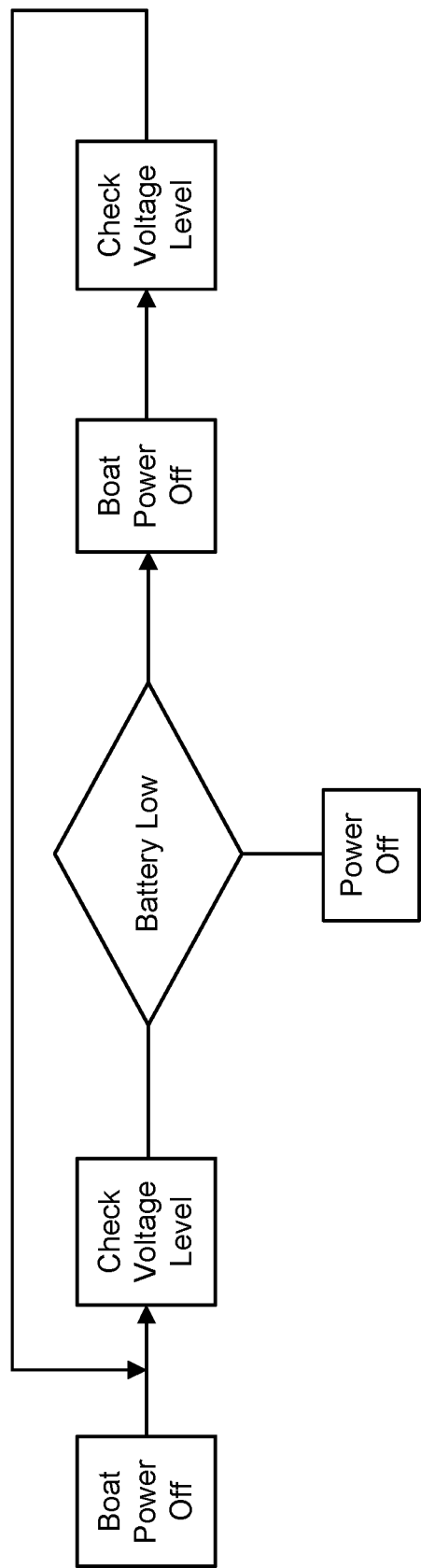
FIG. 18A is a block diagram illustrating an exemplary duty cycle that may be used with the system shown in FIG. 1.
Figure 18B:
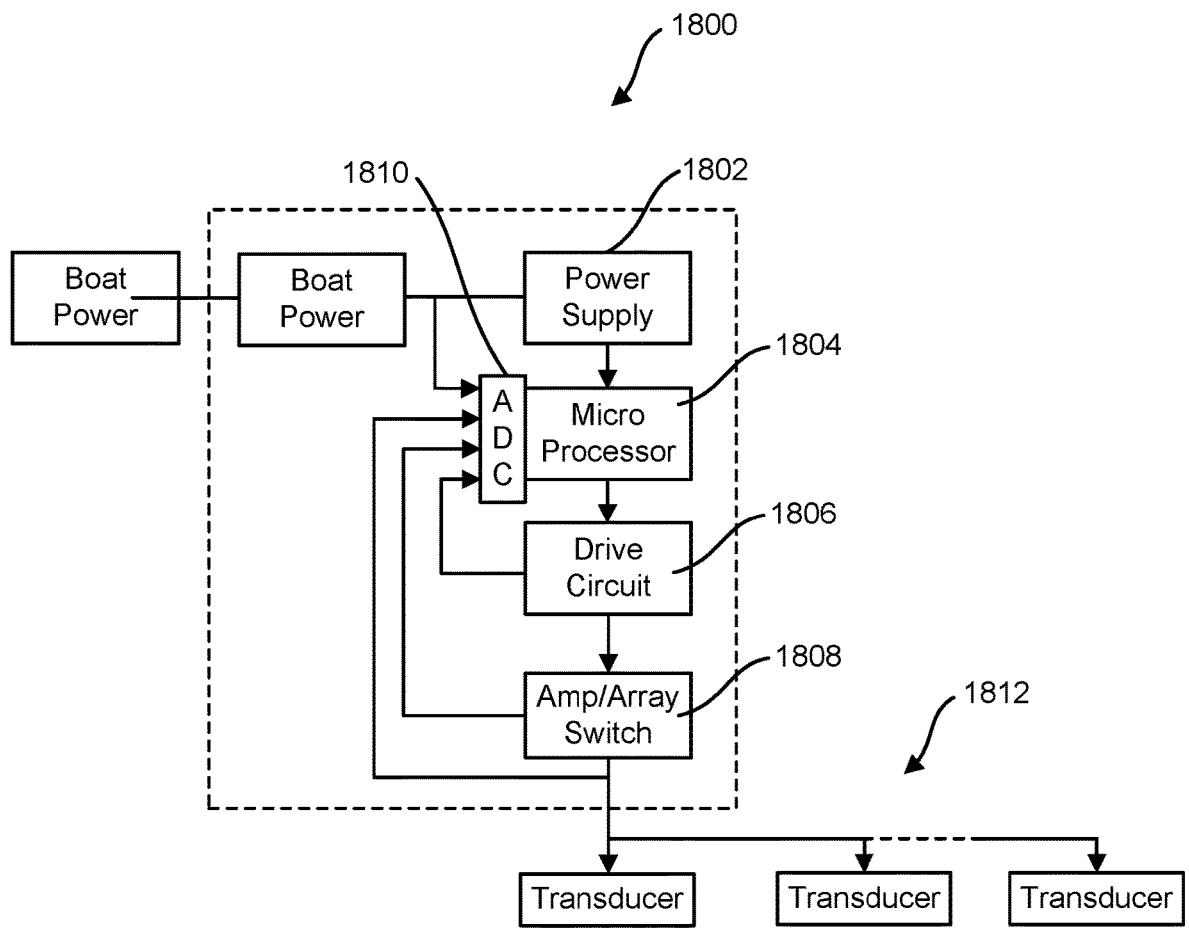
FIG. 18B is a block diagram illustrating an exemplary system that may be used with the duty cycle shown in FIG. 18A.

In another embodiment, the ultrasound transducers are placed inside of pontoons and/or on an exterior pontoon surface under the water line. When the boat is stationary, the transducers may be pulsed individually or as an array to prevent the formation of barnacles, algae, and the like. FIG. 18A illustrates an exemplary duty cycle that can be optimized to prevent drainage of the boat battery. FIG. 18B illustrates an exemplary system 1800 implementing the duty cycle of FIG. 18A. The system 1800 includes a power supply 1802, a microprocessor 1804, a drive circuit 1806, an amplifier/array switch 1808, an analog-to-digital converter (ADC) 1810, and transducers 1812. In an embodiment, at least one of the transducers 1812 includes a sensor for water level and/or temperature. Although described herein in the context of pontoons, one of ordinary skill in the art will understand this configuration can be implemented on any surface that is constructed out of a material that allows for the propagation of acoustic waves including, but not limited to, hulls, pier supports, ladders, buoys, and the like.

Figure 19:
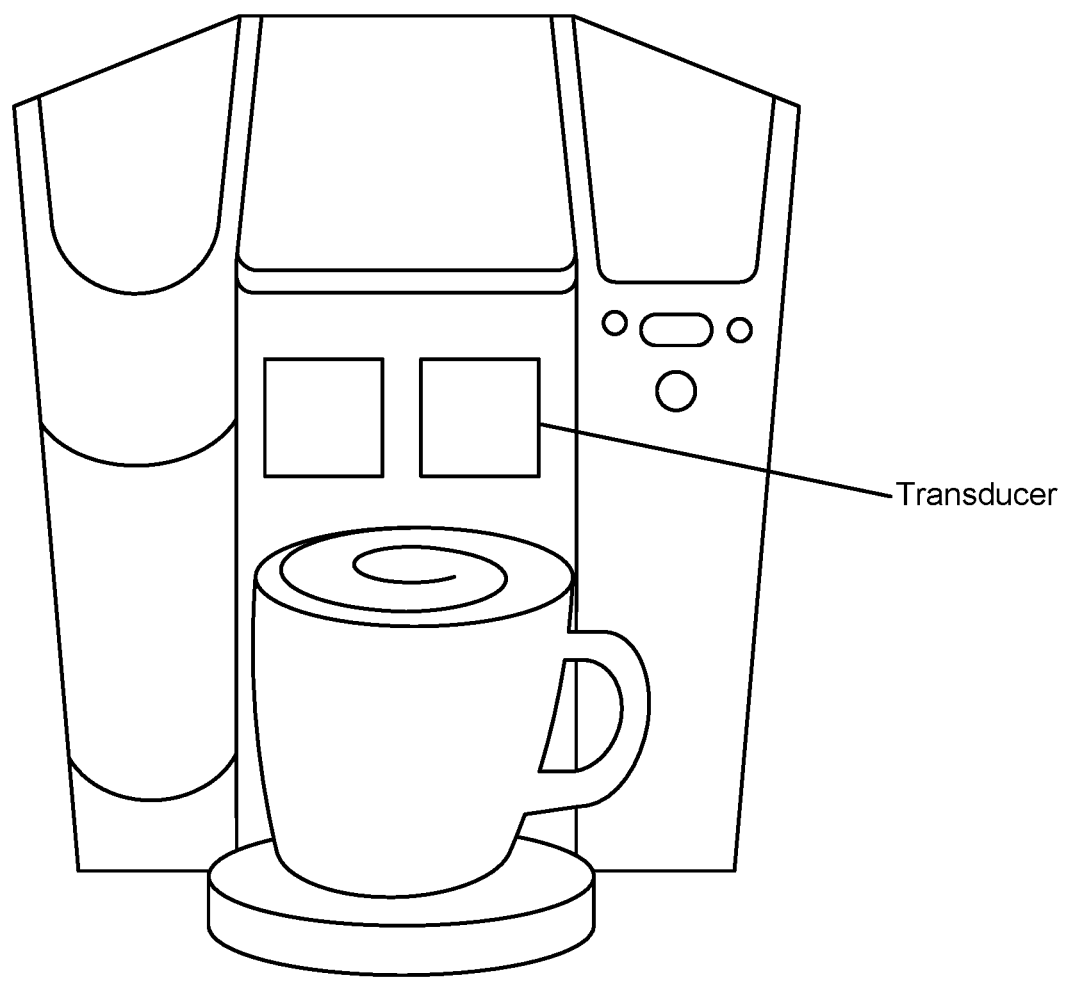
FIG. 19 illustrates an exemplary coffee machine.

Although embodiments incorporating the acoustic electroshock wave generators and/or ultrasound transducers described herein included maritime applications, one of ordinary skill in the art will understand that the acoustic electroshock wave generators and/or ultrasound transducers may be utilized in any water-based application. Exemplary and non-limiting applications include, but are not limited to, pet bowls, pumps, pipes, coffee machines, water coolers, tanks (e.g., stock tanks), livestock water sources, and the like. FIG. 19 illustrates an exemplary coffee machine incorporating ultrasound transducers.

In another embodiment, the acoustic electroshock wave generators and/or ultrasound transducers are used to treat water sources with ultrasonic energy. By using a waveform that is optimized for bacteria and biofilm removal and taking advantage of the non-linarites caused by the change in the speed of sound at the interface of different biologic materials, a device can be constructed to treat algae, biofilm, and bacterial infections with optimal wavelengths. Assuming that the targeted algae, bacteria(s), and/or biofilms respond the best in a range from 20 kHz-80 kHz, one exemplary algorithm for treatment includes modulating the treatment signal over a predefined interval (e.g., 1 minute). When pulsed ultrasound treatment (PUS) is used to minimize heating at a typical pulse ratio of 1:9, meaning the ultrasound output would be active for 1 ms and off for 9 ms, then each pulsed cycle would take 10 ms.

$$\frac{1000\ mS}{10\ mS} = 100\ \text{frequency steps}$$

Since the desired frequency range for the treatment signal is 20 kHz-80 kHz, the frequency step would be calculated as follows:

$$\frac{80\ \text{kHz} - 20\ \text{kHz}}{100\ \text{steps}} = 600\ \text{Hz/Step}$$

Figure 20:
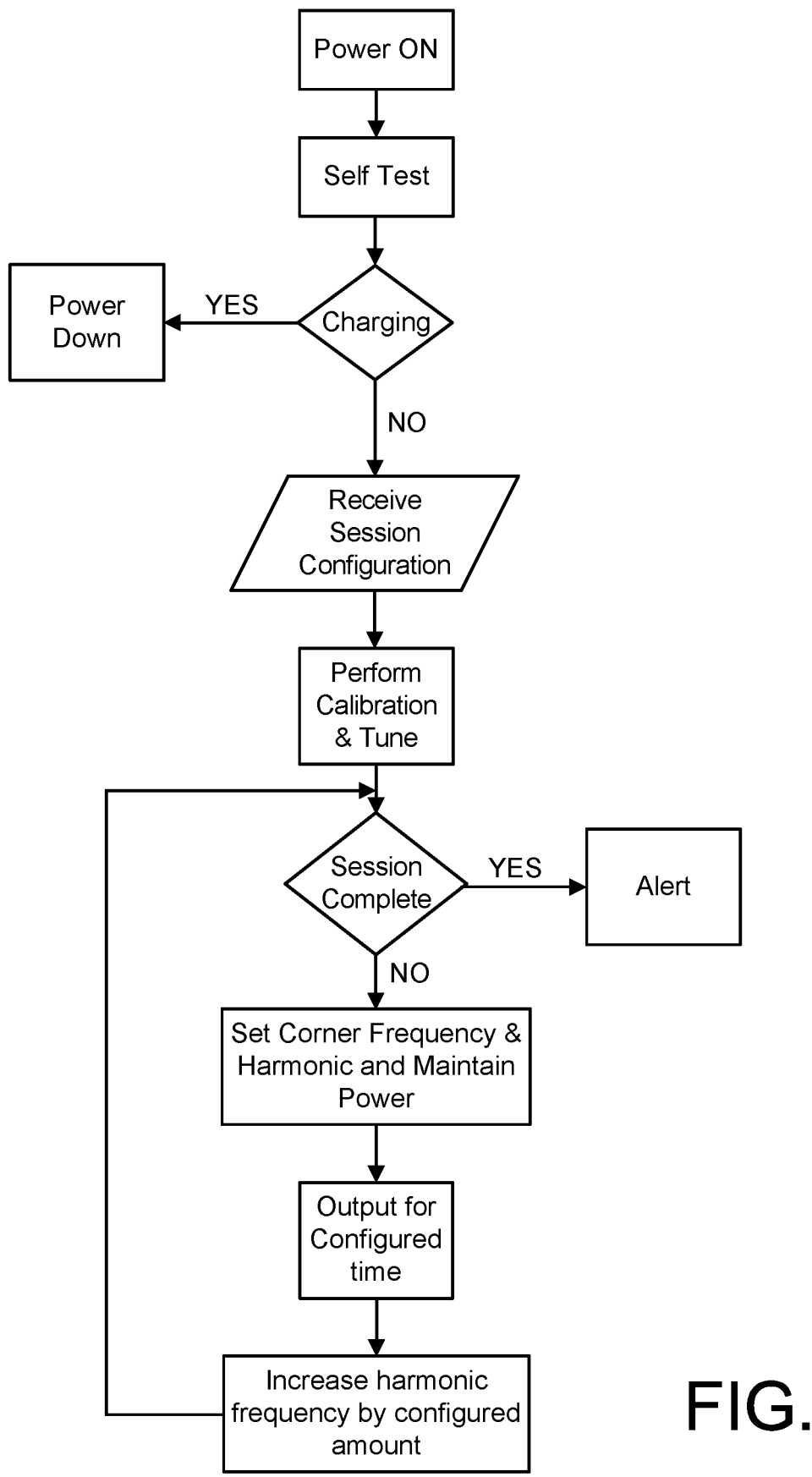
FIG. 20 is a block diagram illustrating an exemplary algorithm that may be used with the system shown in FIG. 1.

In this example, the carrier frequency would be 1 MHz, and the treatment signal would start at 20 kHz. After every pulse cycle of 10 ms, the frequency of the treatment signal would be increased by 600 Hz. Once the upper limit of the treatment signal frequency is reached, in this example 80 kHz, the algorithm would be repeated starting at the start frequency until the desired treatment total time was reached. To optimize power efficiency, the algorithm may run a tune sweep to find the optimal drive frequency. The tune sweep could be performed throughout the treatment to ensure heating and pressure has not caused a shift the optimal drive frequency. A tune sweep may also be initiated when a thermal error occurs. FIG. 20 illustrates this exemplary algorithm. Power and error checking algorithms have been excluded in the flowchart illustrating the exemplary algorithm in FIG. 20 to make overall operation more simple to observe. Furthermore, the acoustic output will have a resonant frequency at 1 MHz with the AM envelope at a frequency equal to 20 KHz+n×600 Hz, where n is equal to the loop count and N is less than 100.

With this algorithm each of the selected treatment envelope frequency is output for the same length time, but the actual amount of periodic waveforms of the treatment envelope frequency would vary by frequency being used. At the lowest treatment frequency, 20 kHz, each envelope period is 0.05 ms, this gives 20 periods of this modulated treatment signal over this frequency step. At the highest selected treatment frequency, 80 kHz, each period is 0.0125 ms, giving 80 periods of the modulated treatment signal over this frequency step. The algorithm could be adjusted so that each desired treatment frequency is active for the same amount of period of the modulated signal, instead of the same amount of time. It is contemplated that the output could be continuous ultrasound (CUS) instead of PUS. The algorithm could be modified to allow for the total energy delivered being the termination condition instead of total treatment time. Alternatively, the algorithm could utilize a constant frequency.

Figure 21:
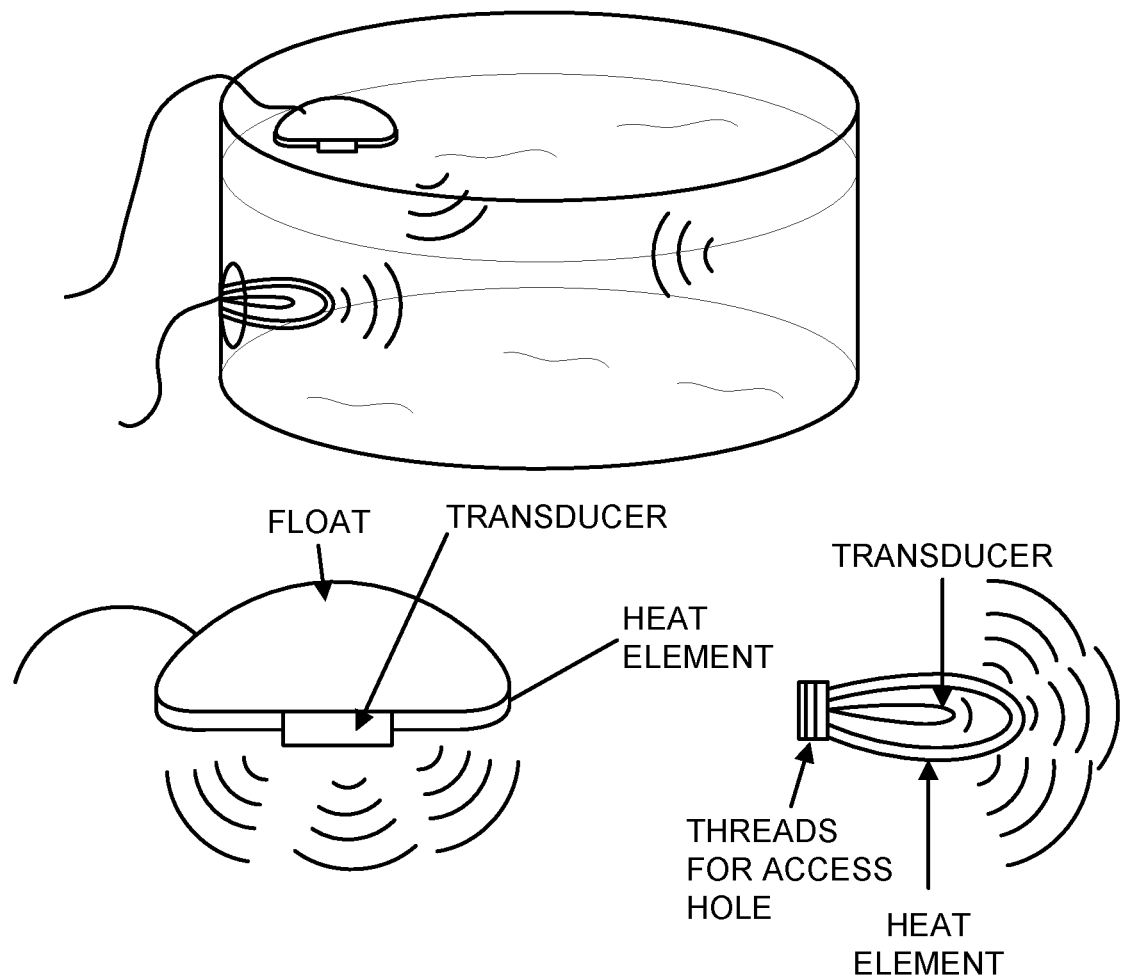
FIG. 21 illustrates an exemplary device used to prevent biofilm and algae from forming in livestock water sources.

In another embodiment, the acoustic electroshock wave generators and/or ultrasound transducers are used to prevent biofilm and algae from forming in livestock water sources. Many livestock tanks become coated in biofilm and algae and have to be cleaned out regularly. Algae and biofilms containing bacteria (coliforms & *E. coli*) pose a health risk to the livestock. In an embodiment, a device including the acoustic electroshock wave generators and/or ultrasound transducers floats on top of the water and transmit ultrasonic waves throughout the tank, as illustrated in FIG. 21. In another method of this embodiment the ultrasound transducer is integrated into a floating tank heater to allow treatment throughout the colder months. Many livestock tanks also have an access hole in the lower part of the tank.

This embodiment may also be fitted to the tank through this access hole. The embodiment may have the ultrasound transducer integrated into the livestock heaters designed for this access hole. Ultrasound treatment and heating can both be selectively shut off depending on the tank needs. The ultrasound device may also be battery powered. The battery may be rechargeable using solar power. This embodiment is not limited to livestock and could be incorporated into any animal water container (e.g., poultry and dog water containers, etc.).

Figure 22:
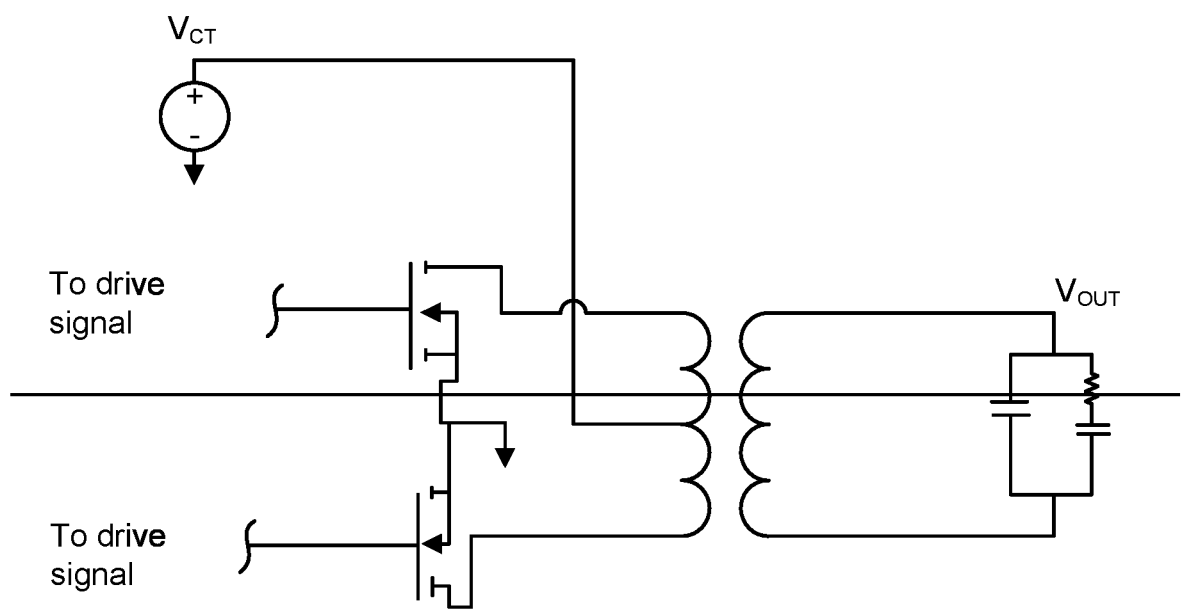
FIGS. 22-25 illustrate exemplary circuits that may be used with the system shown in FIG. 1.

One embodiment of implementing the modulation scheme would be with a traditional center tapped transformer in a push pull configuration, such as the exemplary circuit illustrated in FIG. 22. The voltage to the center tap could be configured to oscillate between the at the target treatment frequency while the carrier frequency would be pulsed to the push-pull FETs. Other analog and digital methods of creating the modulated signal which are known in the art could be implemented as well.

Figure 23:
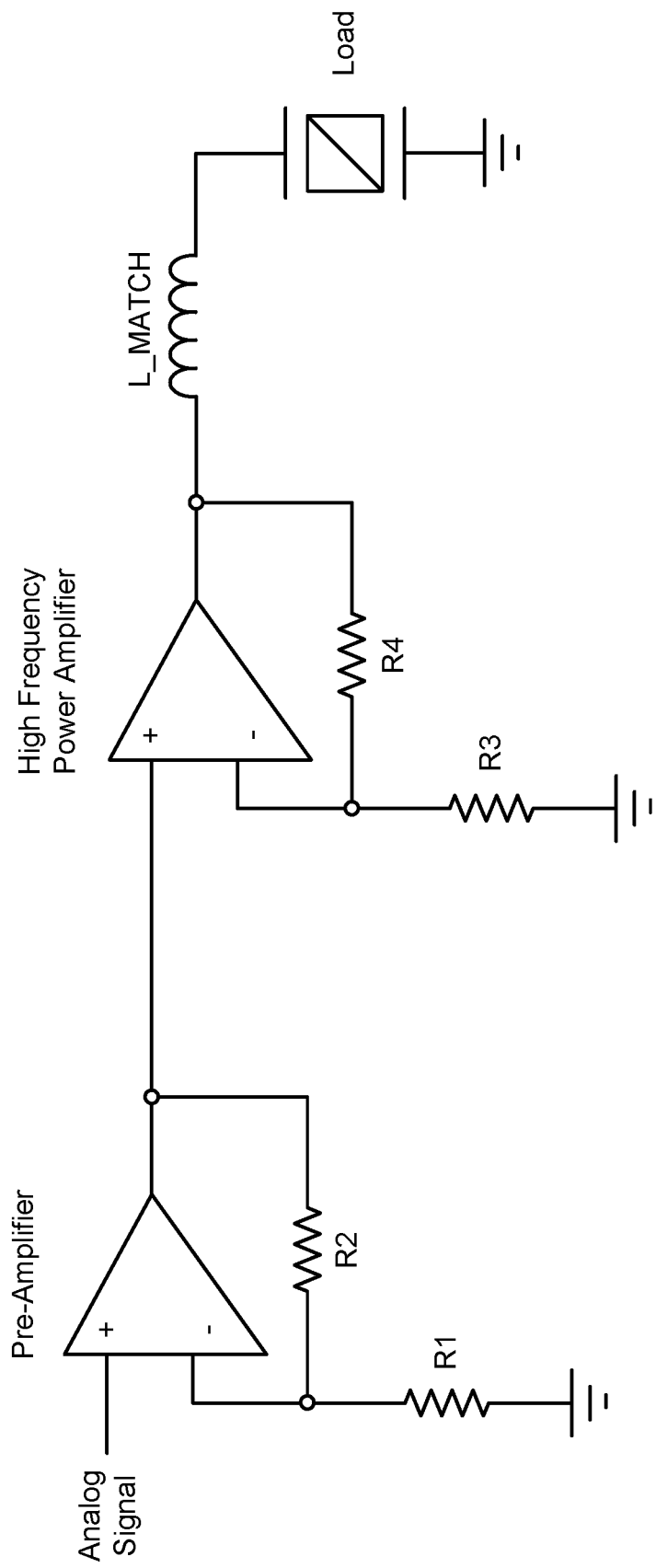

Another embodiment of implementing the modulation scheme would be with a waveform generator and high frequency power amplifier configuration, such as the exemplary circuit illustrated in FIG. 23. The modulated signal, for example supplied by a microcontroller, would be fed into the pre-amplifier with a predetermined gain of $Av=1+(R_2/R_1)$. The amplified signal would then feed into the high frequency power amplifier which would amplify the signal again with the predetermined gain of $Av=1+(R_4/R_3)$. When driving a piezoelectric transducer, a matching inductor is added in series to the load to compensate for the capacitance of the load.

Figure 24:
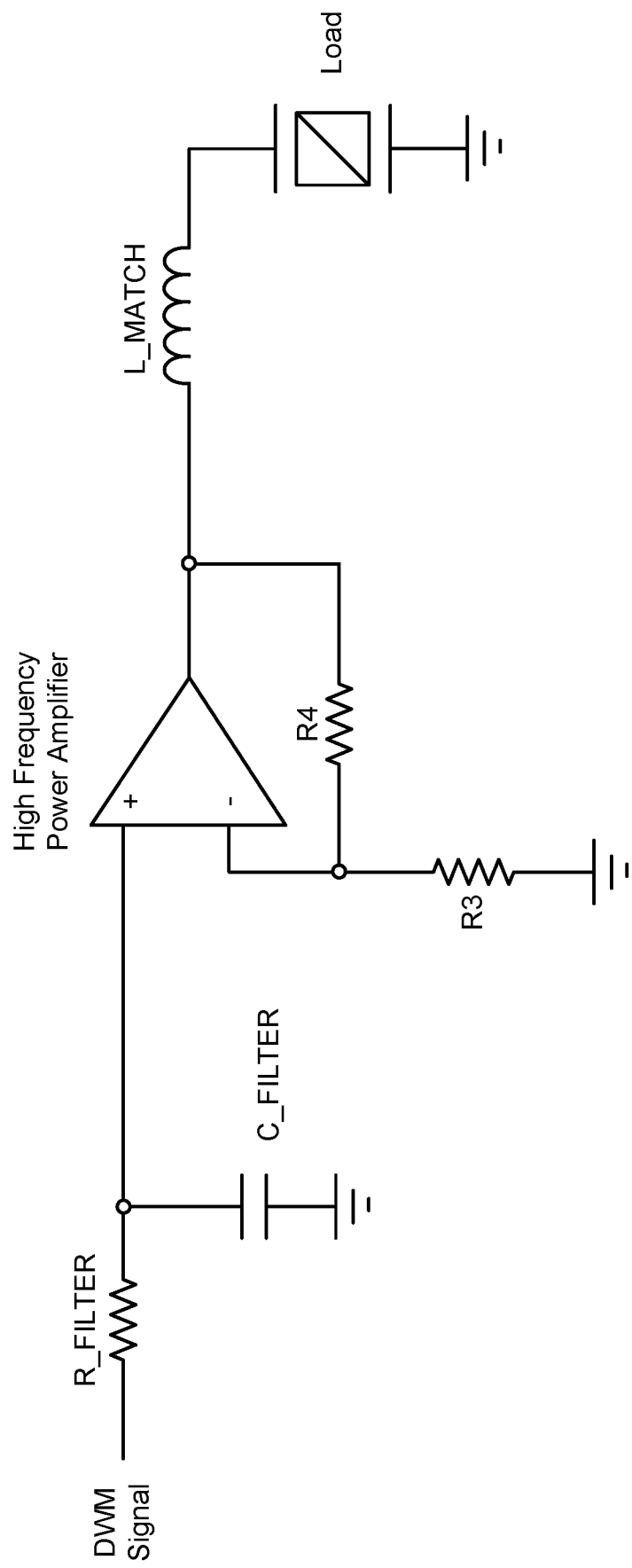

Another method of implementing the modulation scheme would be with a pulse width modulated signal and high frequency power amplifier configuration, such as the exemplary circuit illustrated in FIG. 24. The pulse width modulated signal, for example supplied by a microcontroller, is fed into a RC filter. The RC filter acts as a digital-to-analog convertor and converts the pulse width modulated signal into an analog signal. The cut-off frequency of the RC filter is determined by the equation $Fc=1/(2*Pi*R*C)$. The converted analog signal is then fed into the high frequency power amplifier with a predetermined gain of $A_v=1+(R_4/R_3)$. When driving a piezoelectric transducer, a matching inductor is added in series to the load to compensate for the capacitance of the load.

Figure 25:
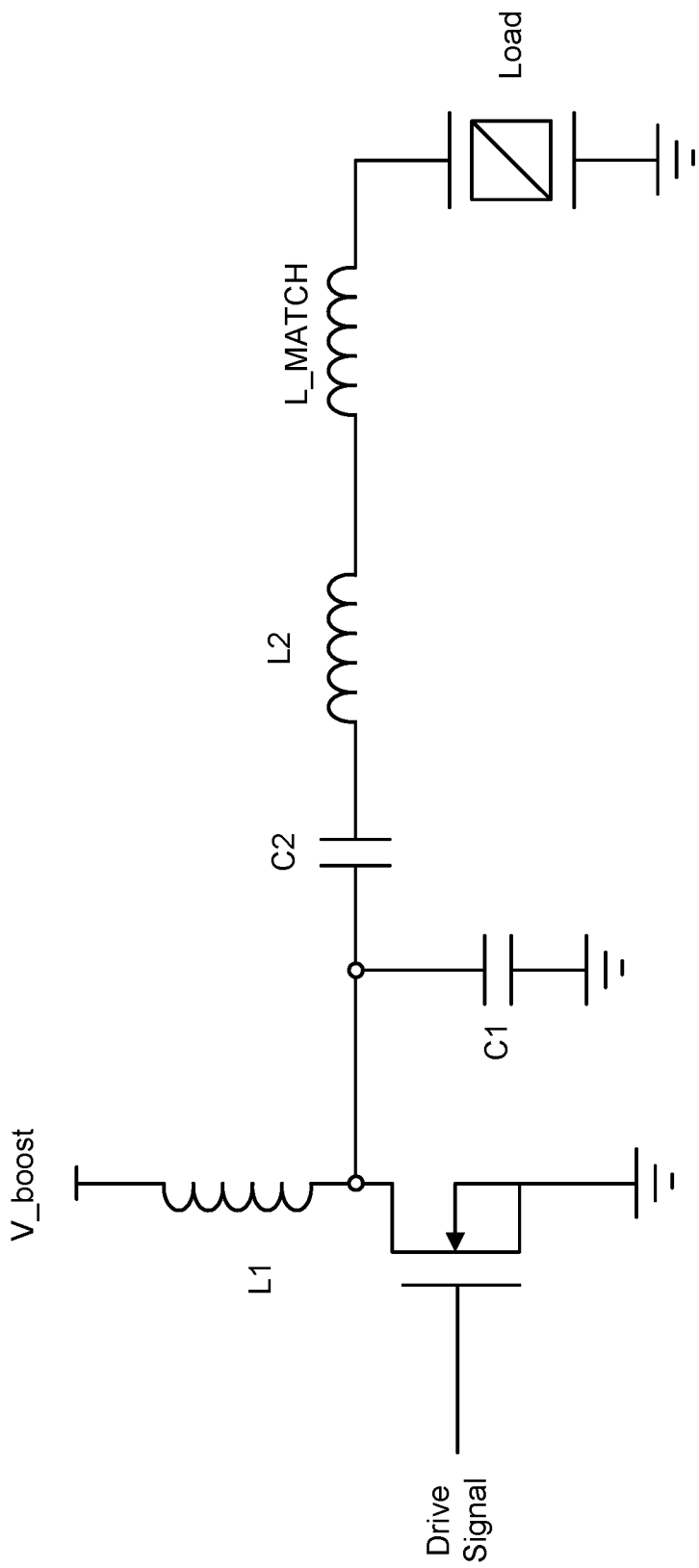

Another method of implementing the modulation scheme would be with a Class E amplifier, such as in the exemplary circuit illustrated in FIG. 25. The Class E amplifier is designed specifically for the drive frequency and N-Channel MOSFET defined. The drive frequency is determined by the desired frequency to drive the load. The values of R_Load, L1, C1, C2 and L2 are determined using the following equations:

$$R_{Load} = \frac{(Vcc - Vo)^2}{P} * 0.576801 -$$
$$\left(1.0000086 - \frac{0.414395}{QL} - \frac{0.577501}{QL^2} + \frac{0.205967}{QL^3}\right)$$

$$C1 = \frac{1}{34.2219 * f * R} * \left(0.99866 + \frac{0.91424}{QL} - \frac{1.03175}{QL^2}\right) + \frac{0.6}{(2*Pi*f)^2 * L1}$$

$$C2 = \frac{1}{2*Pi*f*R} * \left(\frac{1}{QL - 0.104823}\right)$$

-continued
$$\left(1.00121 + \frac{1.01468}{QL - 1.7879} - \frac{0.2}{(2*Pi*f)^2 * L1}\right)$$

$$L2 = \frac{QL * R}{2 * Pi * f}$$

When driving a piezoelectric transducer, a matching inductor is added in series to the load to compensate for the capacitance of the load.

Figure 26:
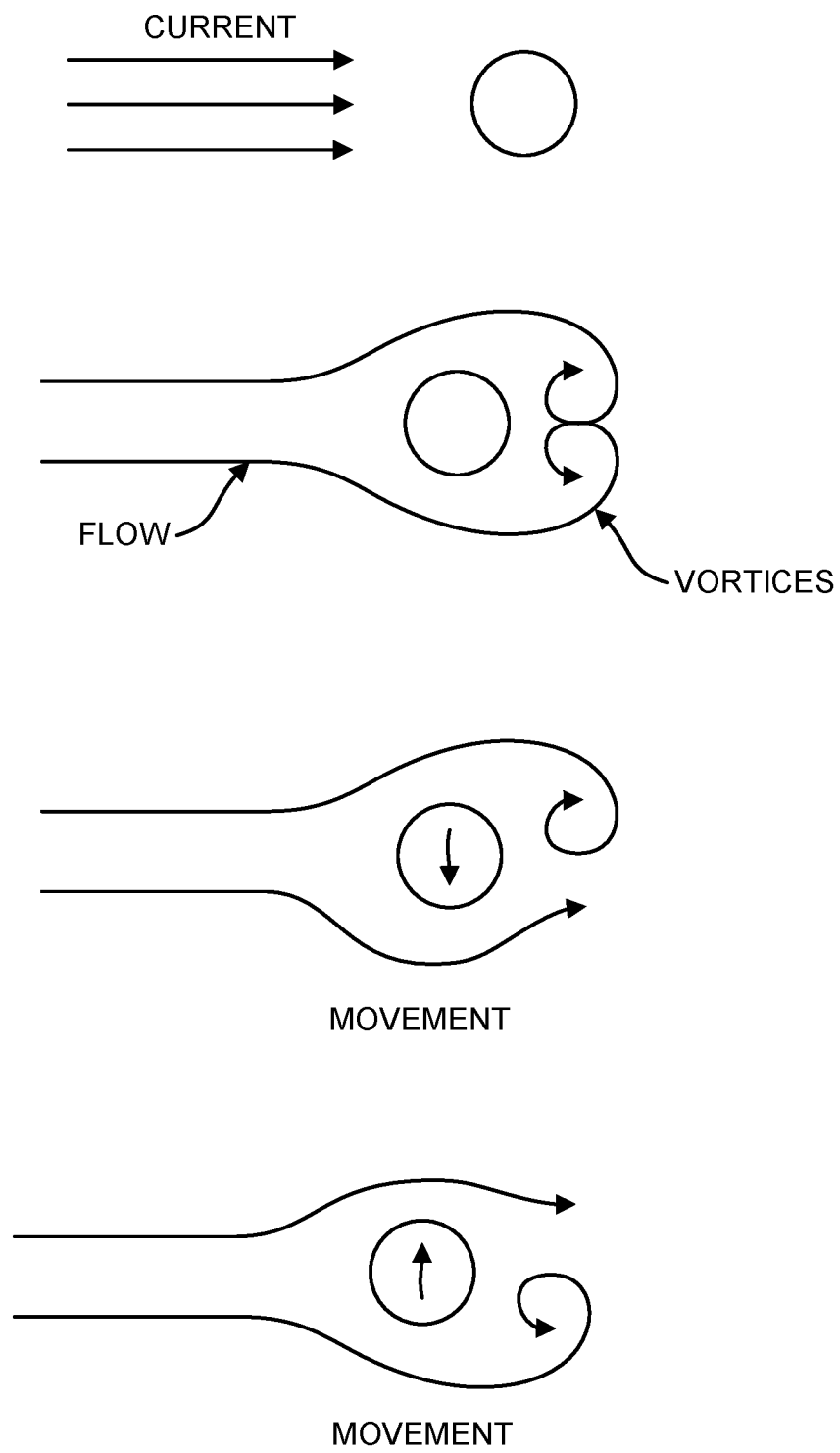
FIGS. 26-31 illustrate exemplary energy harvesting units tuned to vortex-induced vibration frequencies that may be used with the system shown in FIG. 1.
Figure 27:
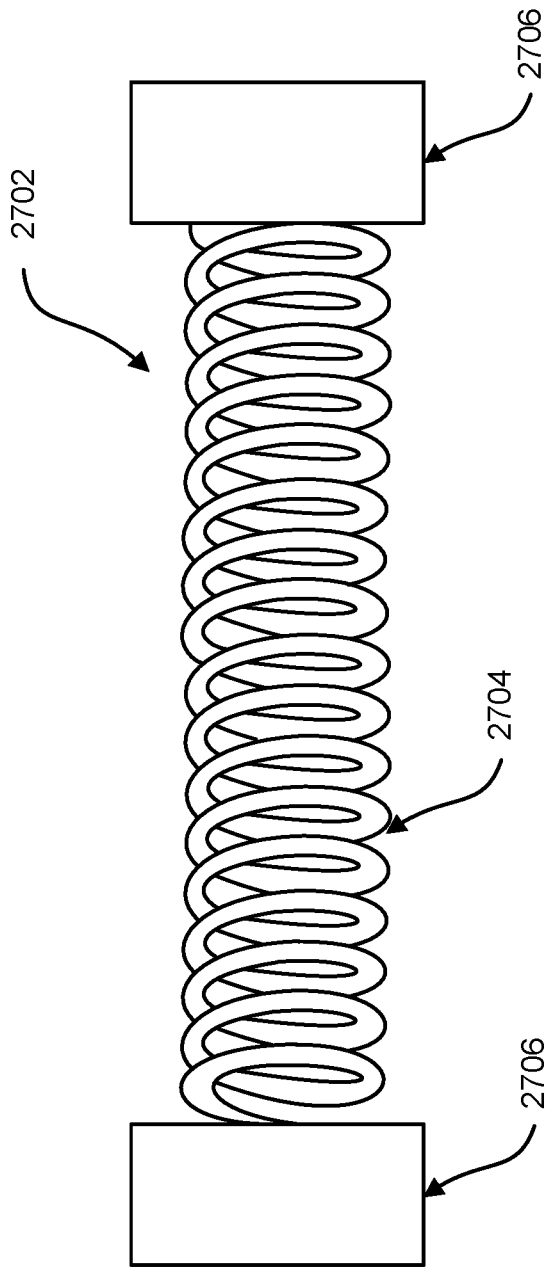

Vortex-induced vibrations (VIV) are motions induced on bodies interacting with an external fluid flow, as illustrated in FIG. 26. These vortex induced vibrations can cause stress and fatigue on structures located in bodies of water (e.g., oil rigs in an ocean, etc.). In an embodiment, piezoelectric transducers are located on such structures and tuned to the resonant frequency of the VIVs to maximize energy harvesting. In alternative embodiments, magnetoresistive transducers or windings (e.g., coils) 2702 and a magnet 2704 can be used to harvest energy, such as the system illustrated in FIG. 27. For systems with a lower frequency caused by VIV, an electromagnetic solution can be used. The resilient members 2706 are tuned to the resonant frequency of the VIV. Non-limiting examples of resilient members 2706 are springs (e.g., coils, leaves, etc.), similar polarity magnets (permanent or electromagnets) that repel, polymers, and/or other elastic materials.

Figure 28:
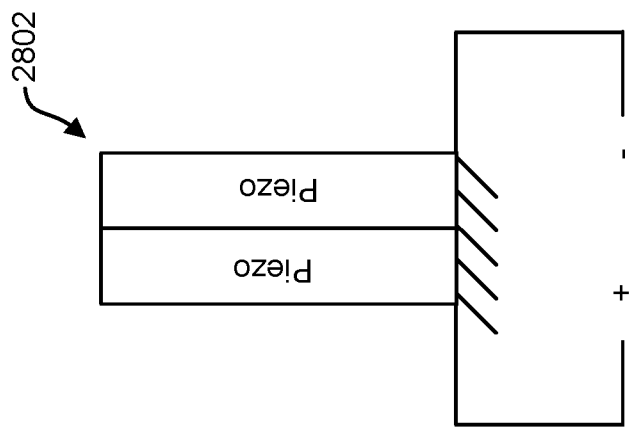
Figure 28:
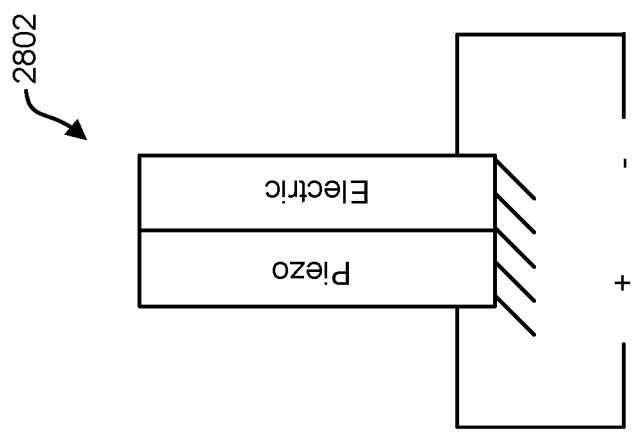

In some embodiments, a cantilevered piezoelectric transducer 2802 can be used to harvest energy, as illustrated in FIG. 28. The cantilevered piezoelectric transducer 2802 can be in unimorph, biomorph, or other configurations. These generators can be located in existing structures that experience VIV, located in standalone structures, and/or in a tethered object.

Figure 29:
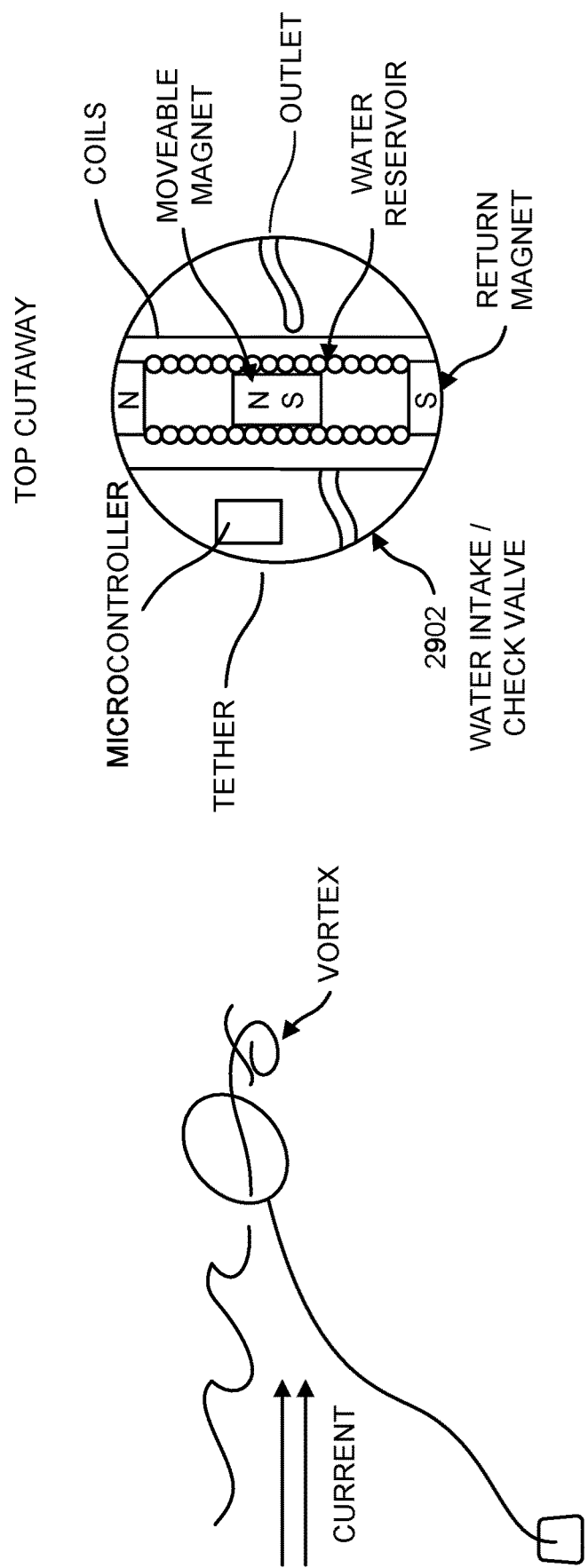

In some embodiments, the piezoelectric transducers can be used to stabilize a unit against vortex-induced vibrations. By using one or more systems, the resonance of the VIV can be determined and an opposing force applied to a structure or unit. For example, opposing VIV can be used to reduce fatigue of the unit or structure. The energy harvesting systems described herein can also be used on any structure that induces turbulence in water. In additional or alternative embodiments, the energy harvesting systems include a plurality of tuned resonators (e.g., systems illustrated in FIGS. 27 and 28, etc.) to react to a plurality of VIV frequencies or have a tunable resonance by using electromagnets at varying intensities and/or an adjustable mechanical stop to limit travel. Additionally or alternatively, energy harvesting units described herein can be tuned by varying the amount of liquid (e.g., water) acting against the piezoelectric transducer or magnetic coil. To reduce the amount of time it takes for the magnet to get to each side of the coil, a check valve 2902 can be opened to let water in to the reservoir (e.g., reservoirs 344), as illustrated in FIG. 29. The water level is increased to tune the system to the vortex-induced vibrations. This water is then released through the check valve 2902 and/or pumped out to compensate for changes. Although the embodiment illustrated in FIG. 29 is a buoy, one of ordinary skill in the art will understand that this water varying technique can be implemented for piezoelectric transducers, fixed pillars and structures, and the like.

Figure 30:
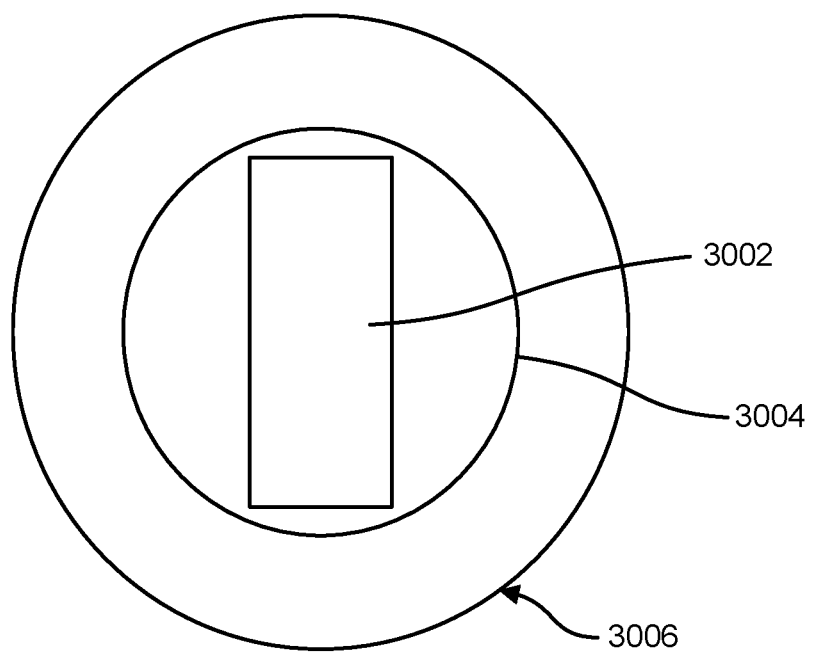

In some embodiments, the shape and/or size of the structure/unit is changed to tune the vortex-induced vibrations to the resonance of the energy harvesting unit, as illustrated in FIG. 30. In an embodiment, an energy harvesting unit 3002 is located within a rigid, sealed inner wall 3004 that keeps the electronic components of unit 3002 dry. A deformable outer wall 3006 can be deformed with water or air to change the period of the vortex-induced vibrations experienced by the structure. For example, this technique can be implemented on buoys, pillars, or the like.

Figure 31:
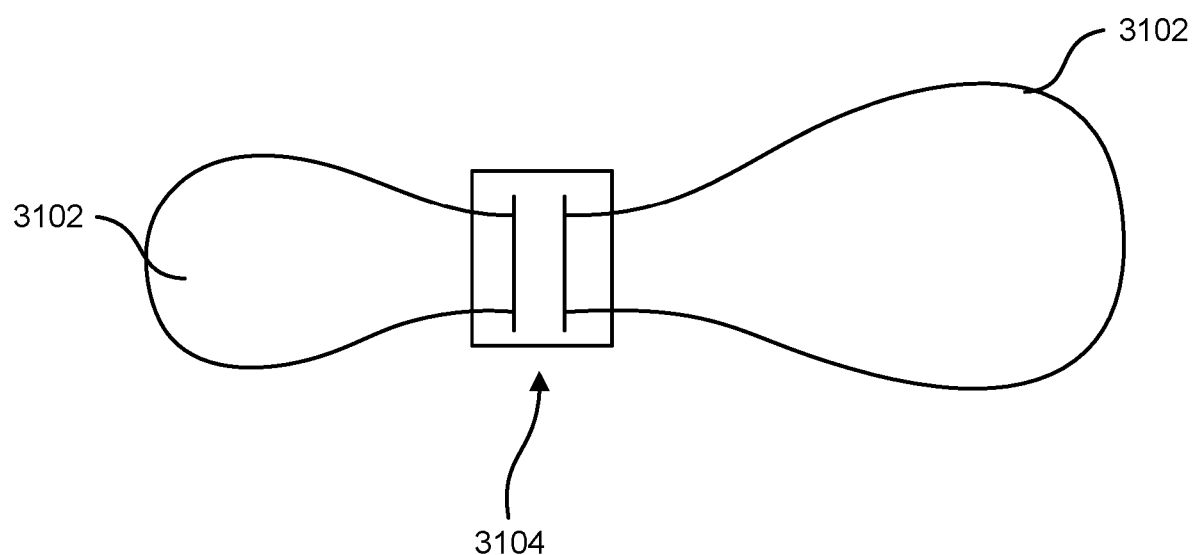

In some embodiments, energy harvesting units described herein can use a plurality of balloons or resilient members filled with a suspension of magnetic particles, as illustrated in FIG. 31. For example, an external force forces the suspension to flow back and forth between balloons 3102 (or resilient members) and through coils 3104, which generates electrical energy.

The resilient members and/or buoys described herein can vary to facilitate energy creation in each environment. As such, resilient members and/or buoys described herein can include those described in U.S. Pat. No. 5,163,949 to Bonutti, which is referenced by incorporation in its entirety. One of ordinary skill in the art will understand that all embodiments described herein can utilize resilient members as described herein. Furthermore, one of ordinary skill in the art will understand that all embodiments described herein related to waves, water flow, and/or vortex-induced vibrations can apply to air and/or other mediums as well.

It should also be noted that while the units described herein have been depicted as being utilized in bodies of water, the units described herein can be substantially reduced in size, placed inside the body to power or be utilized in conjunction with micro robots. The micro robots can be utilized to repair, replace, remove, or diagnose body conditions. In some embodiments, the robots are configured to be left in position for extended amounts of time (e.g., hours, days, weeks, or years) to diagnose, treat, remove, replace, or position cells. In one embodiment, a microrobot utilizing a power generation unit described herein is positioned within the body to clean and/or remove unwanted material and/or tissue. In such embodiments, the robots can include an implantable 3D printer to repair and/or replace damaged tissue and layer down scaffolds, cells, pharmaceuticals, and/or other biologic material (e.g., tissue factors, hormones, etc.) as need to repair in situ. This can diagnose damaged tissue as it is alive and enables moving and changing damaged tissue while repairing such tissue all by the same or a series or robots done over a period of hours days or weeks as patient is active and moving. The units described herein remove the necessity of needing to recharge or deliver energy to the robots. Additionally, the power generation units described herein can be utilized inside the body to power previously positioned implants (e.g., capacitor or battery for a pacemaker, pain pump, or insulin delivery unit).

The power generation units can be inserted or fabricated utilizing the techniques described in U.S. Pat. No. 7,104,996 to Bonutti, which is referenced by incorporation in its entirety. Additionally, the power generation units can be utilized with robots described in U.S. Pat. No. 9,629,687 to Bonutti, which is referenced by incorporation in its entirety as well utilizing visualization techniques described in U.S. patent application Ser. No. 15/299,981 to Bonutti et al., which is referenced by incorporation in its entirety.

The embodiments described herein may utilize executable instructions embodied in a non-transitory computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

The power generation units and other electronics could be shielded using a micro lattice or micro truss enclosure U.S. Pat. No. 6,793,177 to Bonutti. This micro lattice or micro truss enclosure has the potential of shielding the electromagnetic radiation associated with electrical components. This micro lattice or micro truss enclosure could also be used for shielding of permanent magnets. This magnetic shielding could be used in generators, personal electronics, computers, and biologic implants. The lattice structure or micro truss enclosure could be constructed of metal, polymers, ceramics, or any combination. The ceramic microlattice structures could be used as insulation for heat or as a method for dissipating heat. This could be used batteries, engines, commercial and personal electronics. These microlattice structures could be used to create stents and drug eluting stents. These microlattice structures could also be used to form the resilient member of the energy generating devices.

By sending current through the microlattice it is possible to rapidly heat the structure. This heat would quickly dissipate once the current was removed due to the geometry of the lattice. By varying the current into the structure variations in air temperature could be created that would move the air. This can be used to create a speaker for the transmission of sound with no vibrating parts.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
   a surface;
   a plurality of piezoelectric transducers embedded within the surface; and
   a paddle device configured to rotate from the impact force of a fluid wave breaking at the surface, wherein the paddle device includes a plurality of paddles that each strike at least one of the plurality of piezoelectric transducers as the paddle device rotates, and wherein the plurality of piezoelectric transducers convert an impact force of the paddles striking into electrical energy.

2. The system of claim 1, wherein the paddle device rotates at a speed that matches a resonance of the plurality of piezoelectric transducers.

3. The system of claim 1, wherein the paddle device rotates at a speed that is a subharmonic of a resonance of the plurality of piezoelectric transducers.

4. The system of claim 1, further comprising an electrical power storage unit configured to store the electrical energy, wherein the plurality of piezoelectric transducers are operable to supply the electrical energy to at least one of the electrical power storage unit and an electrical energy transmission system.

5. The system of claim 4, further comprising one or more switching devices connected between the piezoelectric transducers and the electrical power storage unit and between the electrical power storage unit and the electrical energy transmission system and a control system operable to control the one or more switching devices.

6. The system of claim 5, wherein the control system is configured to:
- receive power specifications of the electrical energy transmission system and at least one of weather and environmental data,
- determine a percentage of the electrical energy supplied by the plurality of piezoelectric transducers to be directed to one or both of the electrical power storage unit and the electrical energy transmission system based on the power specifications of the electrical energy transmission system and the at least one of weather and environmental data, and
- switch the one or more switching devices for selectively directing the determined percentage of the electrical energy supplied by the plurality of piezoelectric transducers to one or both of the electrical power storage unit and the electrical energy transmission system.

* * * * *